(12) United States Patent
Chin

(10) Patent No.: US 9,082,117 B2
(45) Date of Patent: Jul. 14, 2015

(54) GESTURE BASED AUTHENTICATION FOR WIRELESS PAYMENT BY A MOBILE ELECTRONIC DEVICE

(76) Inventor: David H. Chin, Menlo Park, CA (US)

(*) Notice: Subject to any disclaimer, the term of this patent is extended or adjusted under 35 U.S.C. 154(b) by 495 days.

(21) Appl. No.: 13/189,592

(22) Filed: Jul. 25, 2011

(65) Prior Publication Data
US 2011/0282785 A1 Nov. 17, 2011

Related U.S. Application Data

(63) Continuation-in-part of application No. 12/122,667, filed on May 17, 2008, now Pat. No. 8,174,503.

(51) Int. Cl.
| | |
|---|---|
| G06F 3/041 | (2006.01) |
| G06Q 20/32 | (2012.01) |
| G06F 3/0488 | (2013.01) |
| G06F 21/32 | (2013.01) |
| G06Q 20/10 | (2012.01) |

(52) U.S. Cl.
CPC ........ *G06Q 20/3278* (2013.01); *G06F 3/04883* (2013.01); *G06F 21/32* (2013.01); *G06Q 20/108* (2013.01); *G06F 2203/04808* (2013.01)

(58) Field of Classification Search
CPC .................. G06F 3/04883; G06F 2203/04808; G06F 20/3278; G06F 20/108; G06F 21/32; H04W 12/06; H04B 5/00
USPC ............... 715/863; 235/379; 455/68; 726/19; 345/156–184; 705/42
See application file for complete search history.

(56) References Cited

U.S. PATENT DOCUMENTS

| | | | |
|---|---|---|---|
| 6,053,878 A | * | 4/2000 | Fell et al. ........... 600/595 |
| 6,335,726 B1 | | 1/2002 | Ilan et al. |

(Continued)

FOREIGN PATENT DOCUMENTS

| | | |
|---|---|---|
| CN | 101911378 | 12/2010 |
| EP | 1964022 A1 | 9/2008 |

(Continued)

OTHER PUBLICATIONS

"Some of Apple's Future RFID Magic is revealed in a New Patent"; http://www.patentlyapple.com/patently-apple/2011/09/some-of-apples-future-rfid-magic-is-revealed-in-a-new-patent.html; Sep. 15, 2011.

(Continued)

*Primary Examiner* — Prabodh M Dharia
(74) *Attorney, Agent, or Firm* — David E. Crites

(57) ABSTRACT

A method of gesture based authentication for wireless payment by a mobile electronic device is disclosed. In one aspect, the method includes determining that an applied gesture above a touch receptive area of a target device is associated with a user-defined payment gesture stored locally within the mobile electronic device. The method may include comparing the applied gesture above the touch receptive input area of a mobile electronic device with a user-defined payment gesture stored locally within the mobile electronic device. If the applied gesture above the touch receptive input area of a mobile electronic device matches the user-defined payment gesture stored locally within the mobile electronic device, the method includes permitting the wireless transfer of protected payment data resident on the mobile electronic device to an external reader using near-field communication technology.

18 Claims, 17 Drawing Sheets

(56) References Cited

U.S. PATENT DOCUMENTS

| | | | |
|---|---|---|---|
| 6,346,933 B1* | 2/2002 | Lin | 345/157 |
| 6,515,669 B1* | 2/2003 | Mohri | 345/474 |
| 6,668,081 B1 | 12/2003 | Ilan et al. | |
| 7,004,394 B2 | 2/2006 | Kim | |
| 7,593,000 B1* | 9/2009 | Chin | 345/156 |
| 7,657,849 B2 | 2/2010 | Chaudhri et al. | |
| 7,683,888 B1 | 3/2010 | Kennedy | |
| 7,877,707 B2 | 1/2011 | Westerman et al. | |
| 7,928,965 B2 | 4/2011 | Rosenblatt et al. | |
| 8,020,095 B2* | 9/2011 | Braun et al. | 715/701 |
| 8,028,896 B2* | 10/2011 | Carter et al. | 235/379 |
| 8,046,721 B2 | 10/2011 | Chaudhri et al. | |
| 8,250,187 B2* | 8/2012 | Cacheria et al. | 709/221 |
| 8,255,499 B2* | 8/2012 | Cacheria et al. | 709/221 |
| 8,255,500 B2* | 8/2012 | Cacheria et al. | 709/221 |
| 8,418,085 B2* | 4/2013 | Snook et al. | 715/863 |
| 8,421,761 B2* | 4/2013 | Natanzon et al. | 345/173 |
| 8,539,550 B1 | 9/2013 | Terres et al. | 726/2 |
| 8,793,621 B2* | 7/2014 | Boillot | 715/863 |
| 2004/0215689 A1* | 10/2004 | Dooley et al. | 709/200 |
| 2005/0253817 A1 | 11/2005 | Rytivaara et al. | |
| 2006/0026535 A1 | 2/2006 | Hotelling et al. | |
| 2006/0197756 A1* | 9/2006 | Sun | 345/179 |
| 2007/0067745 A1* | 3/2007 | Choi et al. | 715/863 |
| 2007/0150842 A1* | 6/2007 | Chaudhri et al. | 715/863 |
| 2008/0111710 A1* | 5/2008 | Boillot | 341/22 |
| 2008/0136775 A1* | 6/2008 | Conant | 345/156 |
| 2008/0278455 A1* | 11/2008 | Atkins et al. | 345/173 |
| 2008/0316183 A1 | 12/2008 | Westerman et al. | |
| 2009/0083850 A1* | 3/2009 | Fadell et al. | 726/19 |
| 2009/0085877 A1 | 4/2009 | Chang et al. | |
| 2009/0175499 A1 | 7/2009 | Rosenblatt | |
| 2009/0176517 A1 | 7/2009 | Christie et al. | |
| 2009/0177750 A1 | 7/2009 | Lee et al. | |
| 2009/0221240 A1* | 9/2009 | Zhang | 455/68 |
| 2010/0045705 A1* | 2/2010 | Vertegaal et al. | 345/661 |
| 2010/0078471 A1 | 4/2010 | Lin et al. | |
| 2010/0078472 A1 | 4/2010 | Lin et al. | |
| 2010/0082471 A1 | 4/2010 | Hylton | |
| 2010/0082481 A1 | 4/2010 | Lin et al. | |
| 2010/0082490 A1 | 4/2010 | Rosenblatt et al. | |
| 2010/0174599 A1 | 7/2010 | Rosenblatt et al. | |
| 2010/0199228 A1* | 8/2010 | Latta et al. | 715/863 |
| 2011/0187497 A1* | 8/2011 | Chin | 340/5.54 |
| 2011/0251954 A1* | 10/2011 | Chin | 705/40 |
| 2011/0261213 A1 | 10/2011 | Rottler et al. | |
| 2011/0283241 A1 | 11/2011 | Miller et al. | |
| 2011/0296356 A1 | 12/2011 | Chaudhri et al. | |
| 2011/0300831 A1* | 12/2011 | Chin | 455/411 |
| 2012/0013571 A1* | 1/2012 | Yeh et al. | 345/174 |
| 2012/0023458 A1 | 1/2012 | Chaudhri et al. | |
| 2012/0036556 A1 | 2/2012 | LeBeau et al. | |
| 2012/0081282 A1* | 4/2012 | Chin | 345/156 |
| 2012/0112999 A1* | 5/2012 | Braun et al. | 345/157 |

FOREIGN PATENT DOCUMENTS

| | | |
|---|---|---|
| EP | 2232627 A2 | 9/2010 |
| WO | 2009085777 | 7/2009 |

OTHER PUBLICATIONS

"Inside Apple's iOS 5: LED flash on calls, custom accessibility gestures & vibrations"; http://www.appleinsider.com/articles/11/06/09/inside_apples_ios_5_led_flash_on_calls_custom_accessibility_gesturesvibrations.html; Jun. 9, 2011; 8 Pages.

"NFC payment in Android (Gingerbread)" By Alexander Viken; ; Nov. 17, 2010; 7 Pages.

"Google Patent Reveals Future Unlock Features for Android Devices" by Jack Purcher; http://www.patentlyapple.com/patently-apple/2012/02/google-patent-reveals-future-unlock-features-for-android-devices.html; Feb. 16, 2012; 8 Pages.

* cited by examiner

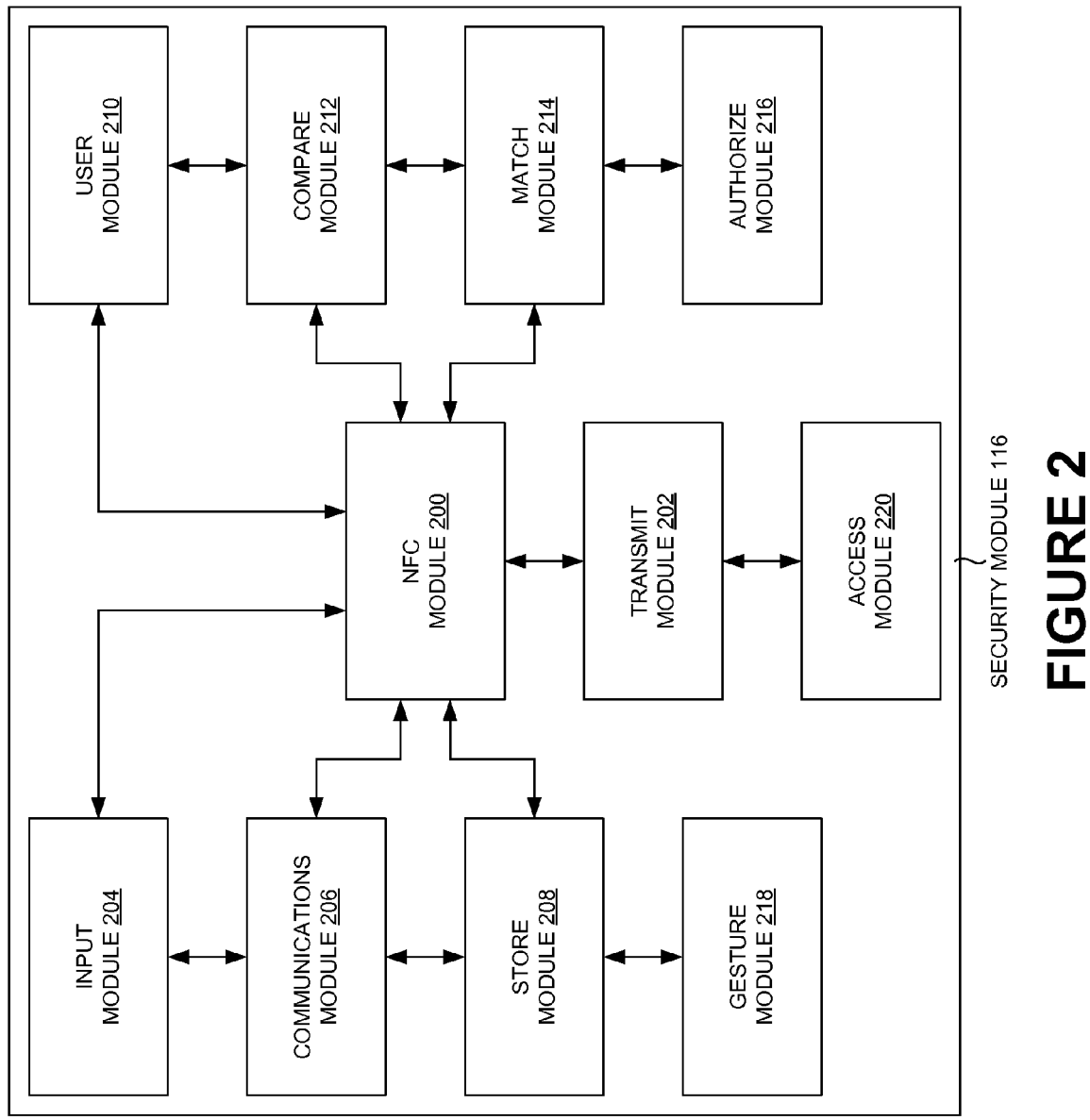

| INITIAL STATE 302 | INPUT GESTURE 304 | INPUT GESTURE MATCHES DESIGNATED PAYMENT GESTURE? 306 | WIRELESS TRANSMISSION OF PROTECTED PAYMENT DATA BY TARGET DEVICE? 308 |
|---|---|---|---|
| LOCKED | APPLIED GESTURE | YES | PERMITTED |
| LOCKED | APPLIED GESTURE | NO | DENIED |
| OPERATING | APPLIED GESTURE | YES | PERMITTED |
| OPERATING | APPLIED GESTURE | NO | DENIED |
| ... | ... | ... | ... |

FIGURE 3

| USER DEFINED PAYMENT GESTURE 802 | ASSOCIATED PAYMENT DATA 804 |
|---|---|
| ∨ | DOUGLAS' PERSONAL VISA CREDIT CARD |
| ↑↑ (SIMULTANEOUS) | DOUGLAS' CORPORATE AMERICAN EXPRESS CHARGE CARD |
| ∧↓ | ELIZA'S PERSONAL DEPARTMENT STORE CREDIT CARD |
| ↻↑ (SEQUENTIAL) | DOUGLAS AND ELIZA'S JOINT CHECKING ACCOUNT DEBIT CARD |
| ● ↑ (HOLD) (SIMULTANEOUS) | EMILY'S 529 ACCOUNT DEBIT CARD |

FIGURE 8

GESTURE BASED AUTHENTICATION FOR WIRELESS PAYMENT BY A MOBILE ELECTRONIC DEVICE

CLAIM OF PRIORITY

This application is a continuation-in-part of U.S. patent application Ser. No. 12/122,667 titled 'Touch-Based Authentication of a Mobile Device through User Generated Pattern Creation' filed on May 17, 2008 now U.S. Pat. No. 8,174,503.

FIELD OF TECHNOLOGY

This disclosure relates generally to a mobile electronic device employing near field communication technology, and in one example embodiment, to gesture based authentication for wireless payment by a mobile electronic device.

BACKGROUND

Near-Field Communication (NFC) technology, an extension of Radio Frequency Identification (RFID), is a standardized open platform technology allowing wireless transmission of data over short distances. The use of NFC technology in contactless mobile payment systems is gaining prominence. Incorporating RFID and NFC capabilities into mobile electronic devices may enable users to pay for purchases using their mobile devices (e.g., a cellular telephone, a mobile media player, a tablet computer, an Apple® iPhone®, an Apple® iPad®, a Google® Nexus S® cell phone, an HTC® Droid® mobile phone, etc.).

In NFC payment systems, the mobile electronic device may contain or have access to sensitive payment data (such as account information associated with a credit card, debit card, bank account, or a store account), which may be wirelessly transmitted to a merchant in order to pay for a purchase. A potential problem with wireless transmission of payment information may be data security. For example, RFID and NFC systems may not ensure secure transmission of confidential payment information and may offer no intrinsic protection from eavesdropping. Despite a range that may be limited to a few centimeters, a transmitted radio frequency signal may be intercepted by a nearby third party. Sensitive data, such as personal identity information or a credit card number, may therefore be misappropriated by an eavesdropper in close physical proximity. Furthermore, if the device containing the NFC capability is lost or stolen, the information stored locally on it or accessible by it (such as payment information) could be used by anyone who finds the device (e.g., to pay for unauthorized purchases).

A mobile electronic device may employ security measures to guard against unauthorized access to or use of sensitive information stored within it; however, a design of the mobile electronic device may make it problematic to implement simple and effective security protocols. For example, the mobile electronic device may utilize a touchscreen (e.g., a screen which can detect the location of touches in a display area) for user input, rather than a physical keypad. On some devices, a user may be able to access the device simply by performing a templated gesture (e.g., sliding an icon from left to right on the surface of a touchscreen). As a result, confidential payment information may be accessed or transmitted by anyone merely in physical possession of the mobile electronic device.

The user may be required to enter a user name and/or password to access or manipulate protected payment data on a mobile electronic device (e.g., to transmit protected payment data stored locally on the device to an NFC reader or initiator device), using a miniaturized keyboard and/or a virtual keypad on a touch-sensitive display screen. This process, however, may be slow, inconvenient, and/or cumbersome (e.g., a fingertip of the user may be of comparatively the same size as the area of a virtual keypad symbol, the mobile keypad may not have the same tactile feel as a physical keypad, etc.). A disabled user (e.g., a visually-impaired person, a user with limited dexterity, etc.) may have difficulty inputting payment information using virtual a keypad. It may be difficult for a user to remember multiple different multi-character pass codes, especially if they must be comprised of long combinations of capitalized and un-capitalized letters, numbers, and symbols (as is often required for financial accounts), and/or if they must be changed regularly. Furthermore, it may be cumbersome to sequentially enter a series of different alphanumeric user names and passwords in order to expediently access multiple sets of confidential payment data (e.g., the user may wish to choose different payment options for different transactions).

What is needed is a security method enabling a user of an NFC-equipped mobile electronic device to quickly and conveniently authorize wireless transmission of protected payment information stored locally within the mobile device to an NFC-capable reader for touchless payment.

SUMMARY

A method of gesture based authentication for wireless payment by a mobile electronic device is disclosed. In one aspect, the method includes determining that an applied gesture above a touch receptive area of a target device is associated with a user-defined payment gesture (for e.g., a designated payment gesture defined by the user of the mobile device). The method may include comparing the applied gesture above the touch receptive input area of a target device (which may be any mobile electronic device equipped with NFC payment capabilities) with a user-defined payment gesture stored locally within the target device (e.g., on the target device's internal hard drive or on a memory card).

If the applied gesture on the touch receptive input area (e.g., a touchscreen) of the target device matches the user-defined payment gesture stored locally within the target device, the method may include permitting the wireless transmission (e.g., using NFC technology) of protected payment data resident on the target device to an initiator device (e.g., an NFC reader, a contactless smart card reader based on RFID technology, an NFC scanner, etc.). However, if the applied gesture on the touch receptive input area of the target device does not match the user-defined payment gesture stored locally within the target device, the method may include denying the wireless transmission of the protected payment data resident on the target device to the initiator device.

In another aspect, the method may include accepting a user-defined payment gesture (e.g., a tactile or haptic gesture) as an input on a touch receptive input area of a target device. The method may then include storing the user-defined payment gesture locally within the target device and comparing an applied gesture on the touch receptive input area of the target device to the user-defined payment gesture. If the applied gesture on the touch receptive input area of the target device matches the user-defined payment gesture stored locally within the target device, the method may include permitting the wireless transmission of protected payment data resident on the target device to an initiator device. Similarly, if the applied gesture on the touch receptive input area of the target device does not match the user-defined payment gesture stored locally within the target device, the method may include denying the wireless transmission of protected payment data resident on the target device to an initiator device.

The method may include the transmission of the protected payment data resident on the target device to the initiator device by relying on magnetic induction between a loop antenna located within an electromagnetic field of the target device and an another loop antenna located within an another electromagnetic field of the initiator device such that a strong inductive effect and a strong capacitive effect may be present in a near field region of an electromagnetic radiation that may emanate from the loop antenna and the another loop antenna thereby forming an air-core transformer. The method may also include the target device operating in a passive communication state such that the initiator device may provide the electromagnetic field and the target device may answer by modulating the another electromagnetic field during which the target device may draw its operating power from the electromagnetic field provided by the initiator device.

Further, the method may also include the target device operating in an active communication state such that both the target device and the initiator device may be self-powered and may communicate by alternatively generating their own electromagnetic fields and deactivating their Radio Frequency (RF) fields before the target device may transmit the protected payment data resident on the target device to the initiator device. According to one aspect, the method may include the target device operating in an emulation state such that the target device may permit the wireless transmission of the protected payment data resident on the target device to the initiator device when the applied gesture on the touch receptive input area of the target device matches the user-defined payment gesture stored locally within the target device.

Another aspect may include the target device operating in a reader state such that the target device may read a request (e.g., a request to send the user's credit card information) from the initiator device for the wireless transmission of the protected payment data resident on the target device to the initiator device. In addition, and according to one aspect, the target device may operate in a peer-to-peer (P2P) state such that the target device may read a request from the initiator device for the wireless transmission of the protected payment data resident on the target device to the initiator device and may permit the wireless transmission of the protected payment data resident on the target device to the initiator device if the applied gesture on the touch receptive input area of the target device matches the user-defined payment gesture stored locally within the target device.

The method may also include a process whereby the target device may permit entry of the applied gesture above the touch receptive input area of the target device (e.g., on the touchscreen of a mobile electronic device equipped with NFC technology) prior to and in anticipation of a request from the initiator device (e.g., some time period before the user wishes to transmit his/her bank account and/or credit card information to pay for his/her purchase) for the wireless transmission of the protected payment data resident on the target device to the initiator device. According to one aspect, the method may include an initiator device which is also a remote computer server operating through a wide area network and may also include a target device which may be a mobile electronic device (e.g., a mobile phone, a mobile media player, a tablet computer, an Apple® iPhone®, an Apple® iPad®, a Google® Nexus S®, a HTC® Droid® etc.).

Furthermore, and according to another aspect, the user-defined payment gesture may be application specific (e.g., to activate an application such as the Starbucks® Mobile App resident on the target device) and the target device may only permit a finite number of wireless transmissions (e.g., two times) of the protected payment data and may only permit the wireless transmissions of the protected payment data for a finite period of time (e.g., twenty seconds). In addition, the method may include a process wherein a remote computer server may send a deactivating signal to the target device preventing transmission of protected payment data in response to interrogation by an initiator device if the owner or authorized user of the target device reports that it has been lost, stolen, cloned, or otherwise compromised.

BRIEF DESCRIPTION OF THE DRAWINGS

Example embodiments are illustrated by way of example and not limitation in the figures of the accompanying drawings, in which like references indicate similar elements and in which:

FIG. 1F shows the wireless transmission of data between the target device and initiator device using NFC technology, according to one or more exemplary embodiments.

FIG. 2 is a block illustration of the contents of a security module and processes that may occur within, according to one or more embodiments.

FIG. 3 is a table view of the initial state, input gesture, and the wireless transmission of the protected payment data dependent on gesture matching, according to one or more exemplary embodiments.

FIG. 8 illustrates a table view of different associated payment data that may be resident on the user's target device that may be associated with different user-defined payment gestures.

Figure 1A:
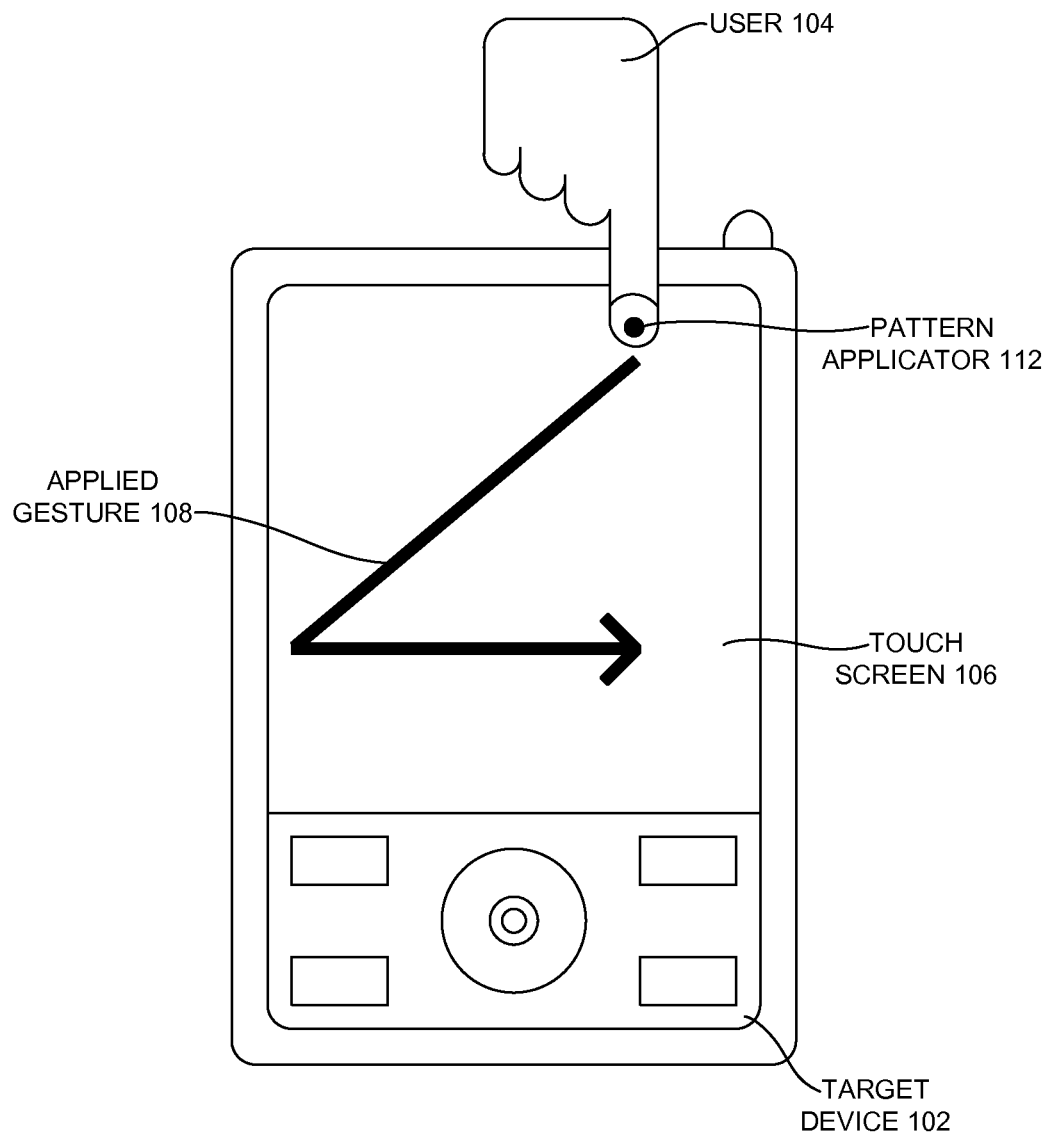
FIGS. 1A, 1B, 1C, 1D, 1E and 1F illustrate a system view of a target device and initiator device illustrating an application of a gesture through a tactile/haptic pattern on a touch screen or on a touch-receptive input area, according to one or more embodiments.
Figure 1B:
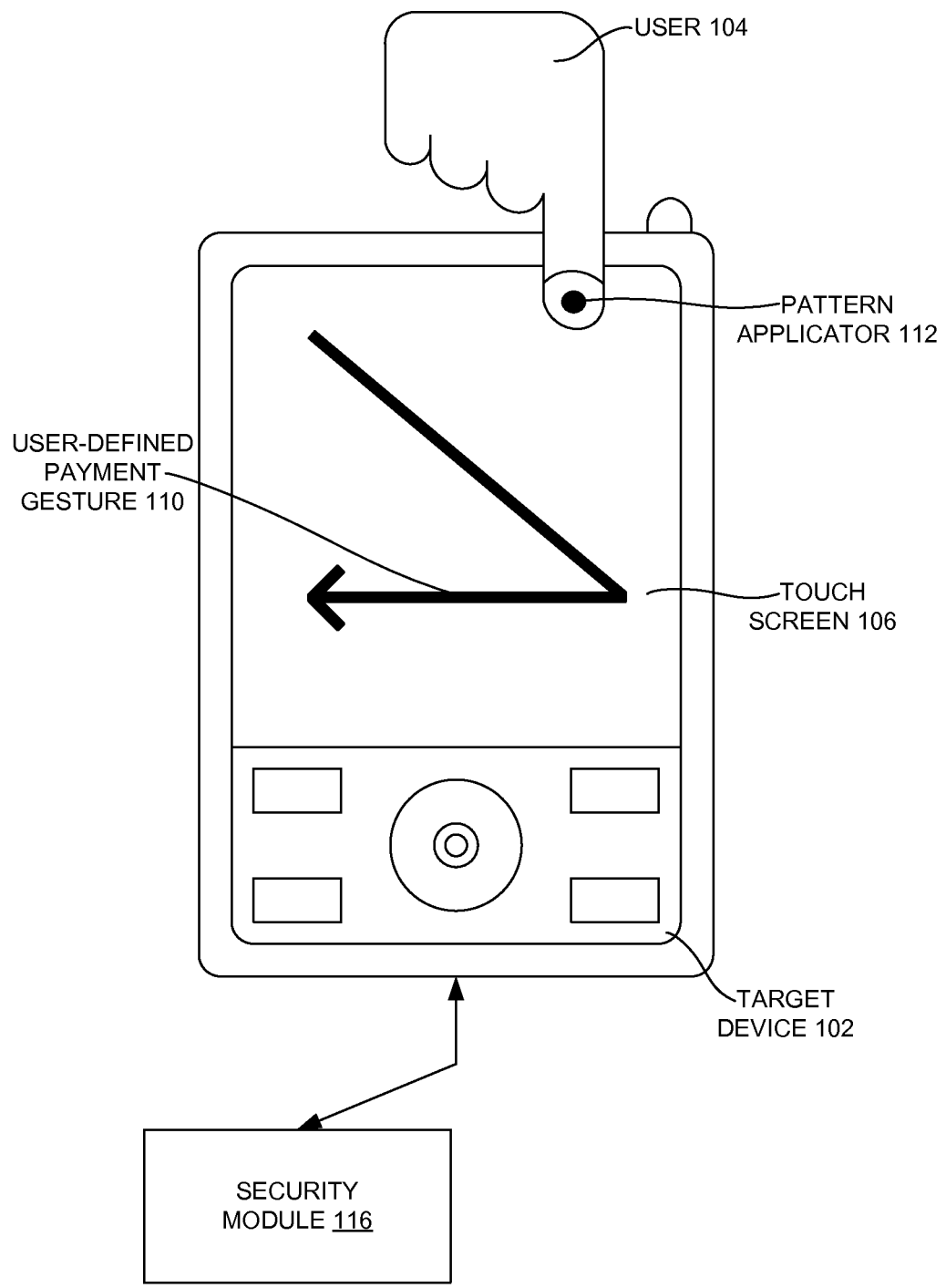
Figure 1C:
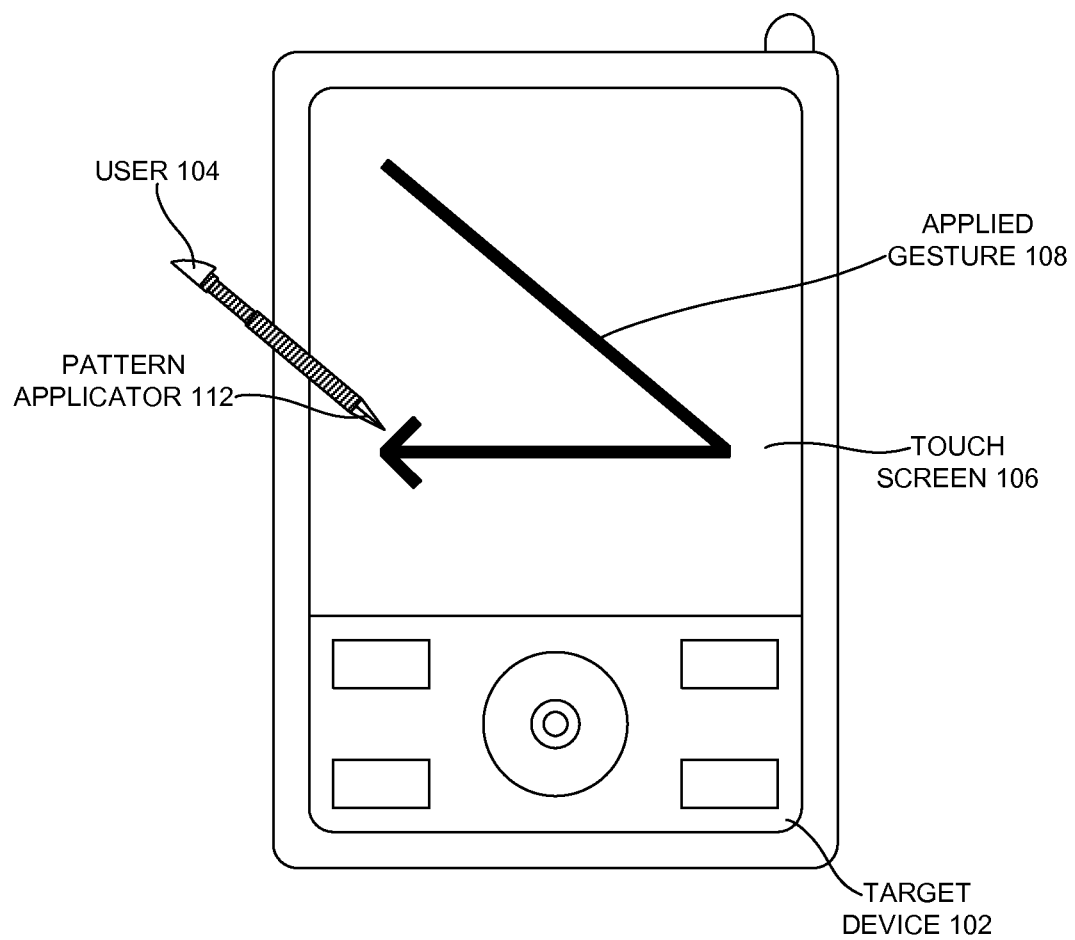
Figure 1D:
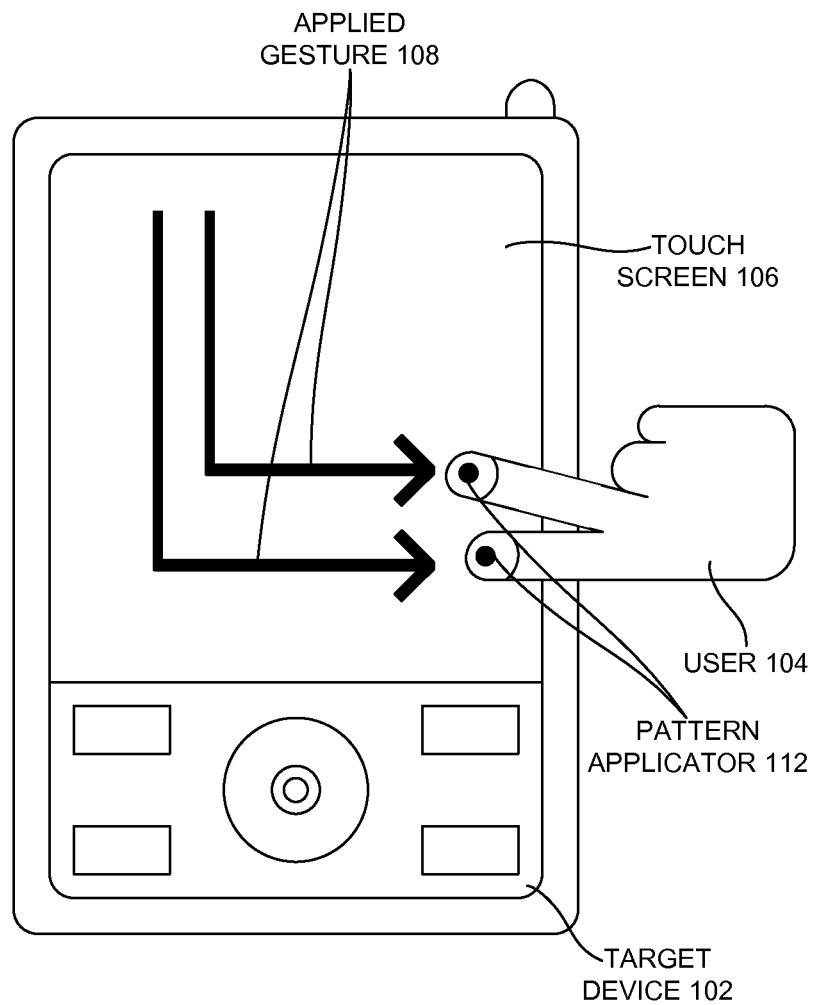

Other features of the present embodiments will be apparent from the accompanying drawings and from the detailed description that follows.

DETAILED DESCRIPTION

A method comprising determining that an applied gesture 108 above a touch receptive input area 114 of a target device 102 is associated with a user-defined payment gesture 110 and comparing the applied gesture 108 with a user-defined payment gesture 110 stored locally within the target device 102 is disclosed. In addition, the method comprises either permitting or denying the wireless transmission of a protected payment data 400 (e.g., using NFC technology) from the target device 102 (e.g., a mobile electronic device, a mobile phone, a mobile media player, a tablet computer, an Apple® iPhone®, an Apple® iPad®, a Google® Nexus S®, a HTC® Droid® etc.) to an initiator device 100 (e.g., an NFC scanner or external reader) depending on whether the applied gesture 108 on the touch receptive input area 114 matches (wireless transmission of protected payment data 400 permitted) or does not match (wireless transmission of protected payment data 400 denied) the designated payment gesture defined by the user (e.g., the user-defined payment gesture 110) stored locally within the target device 102.

In the following description of preferred embodiments, reference is made to the accompanying drawings which form a part hereof, and in which it is shown by way of illustration specific embodiments in which the invention can be practiced. It is to be understood that other embodiments can be utilized and structural changes can be made without departing from the scope of the preferred embodiments of the present invention.

Figure 1E:
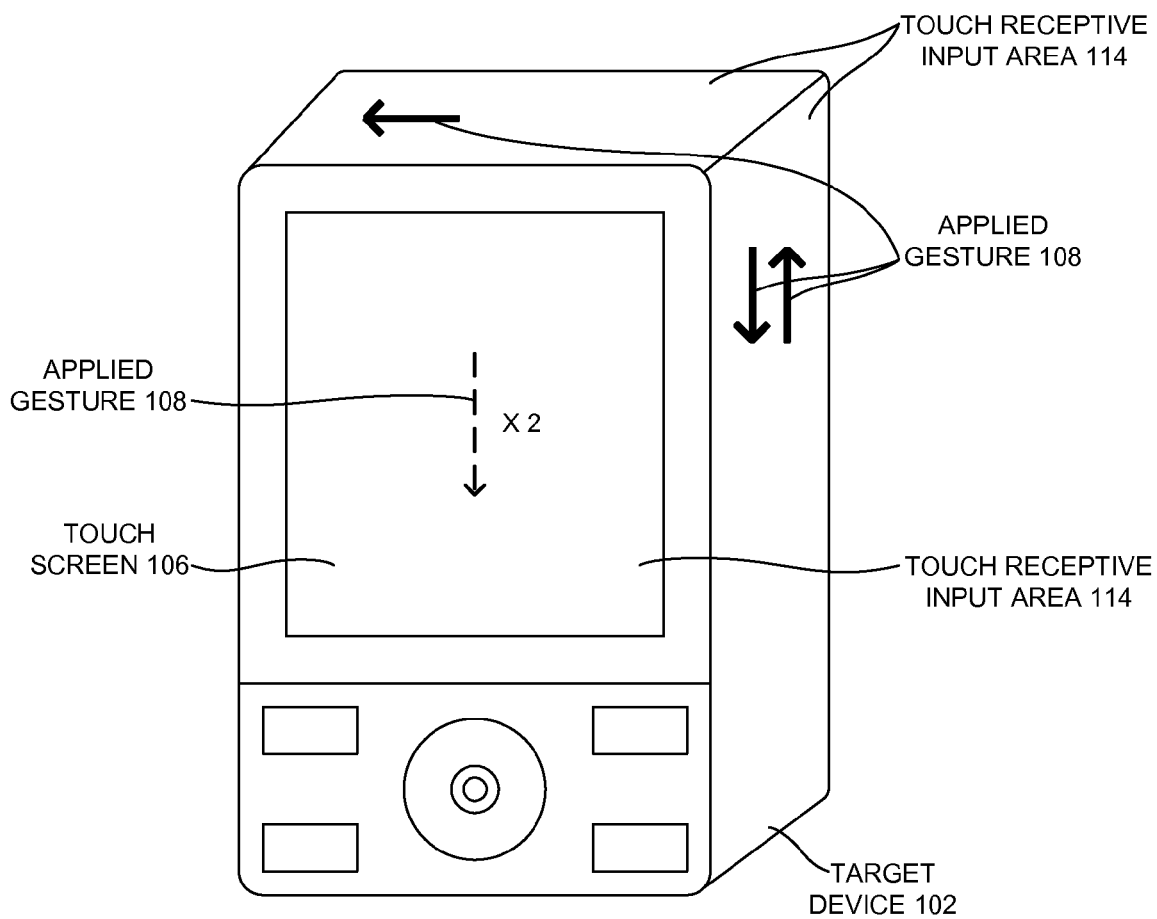

FIGS. 1A, 1B, 1C, 1D, 1E and 1F illustrate an initiator device 100 and a target device 102 according to one or more exemplary embodiments. The target device 102 may be a mobile electronic device (such as a mobile phone or a tablet) and may have a touch-receptive touchscreen 106. The user 104 may use his/her finger as a pattern applicator 112 to perform an applied gesture 108 above the target device 102 (such as on top of touchscreen 106). According to one embodiment, the applied gesture 106 may be stored locally within the target device 102 and may be designated as a user-defined payment gesture 110 (e.g., the designated payment gesture to permit wireless transmission of protected payment data 400). It may be that according to one embodiment, the applied gesture 108 may be performed on any touch receptive input area 114 of the target device 102 (as illustrated in FIG. 1E). The applied gesture 108 may be independent of a scale value and a position value on the touchscreen 106 or may be dependent of a scale value and a position value on the touchscreen 106. The applied gesture 108 may or may not depend on sequential activation of fixed areas on the touchscreen 106. The applied gesture 108 may be performed on any location within an input region of the target device 102, for example, the non-display touch-receptive input area 114. In another embodiment, the applied gesture 108 may be applied on a touchscreen 106 comprising a visual template. The visual template may comprise multiple distinct dotted locations and/or dotted-patterning.

Figure 1F:
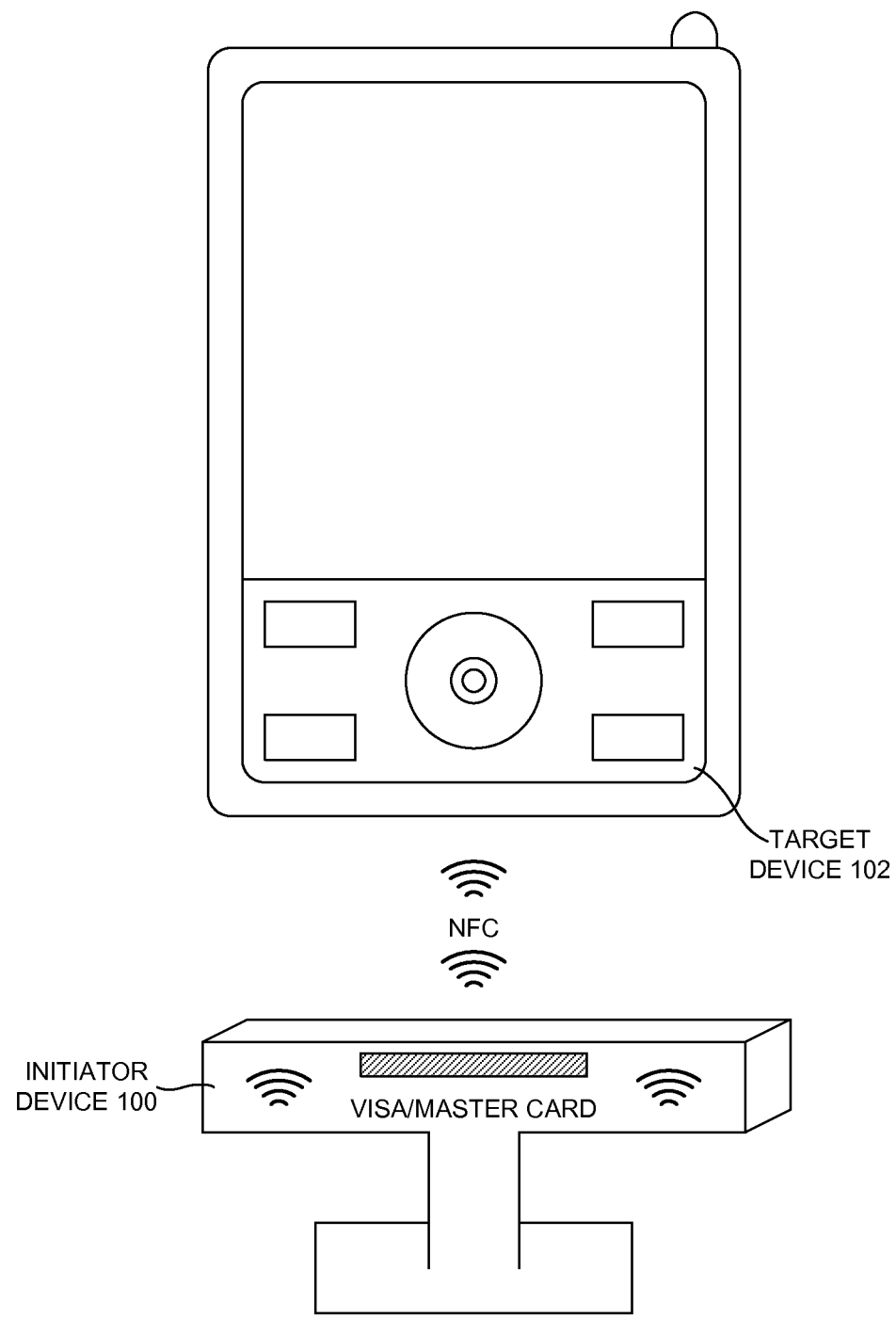

According to one embodiment and as illustrated in FIG. 1F, the target device 102 and the initiator device 100 may communicate with each other wirelessly using NFC technology. NFC may be a short-range wireless technology and may require a particular distance between the initiator device 100 and the target device 102 (e.g., four centimeters or less). It may operate at 13.56 MHz and at rates ranging from 106 k bit/s to 848 k bit/s, according to one or more exemplary embodiments. When both the target device 102 and the initiator device 100 are powered, peer-to-peer (P2P) communication may be possible, according to one embodiment. The NFC technology to communicate and wirelessly transmit data from the target device 102 and the initiator device 100 (and vice-versa) may be used for sharing, pairing or for a transaction, according to one or more exemplary embodiments. In addition, a target device 102 may be an object containing an RFID tag or embedded integrated circuits, which may store and process information and modulate and demodulate a radio frequency signal, which may be received and transmitted by an antenna, according to one embodiment.

According to one more embodiments described herein, RFID may be used as a technology allowing transmission of data over short distances (up to about 20 cm) by means of radio waves (such as the wireless transmission of the protected payment data 400). This may involve exchange of information between a reader or interrogator (e.g., initiator device 100) and tag (e.g., target device 102), consisting of an integrated circuit embedded within an object. The integrated circuit may store and processes information, and may modulate and demodulate a radiofrequency signal, which is received and transmitted via an antenna. The RFID tag may be passive (having no internal power source and powered by resonant energy transfer via an inductor-capacitor or LC circuit), active (having a battery and capable of transmitting a radiofrequency signal once an external reader has been identified), or may be battery-assisted passive, according to one or more embodiments.

According to another embodiment, RFID technology may be employed in contactless integrated circuit devices, alternatively known as proximity cards or contactless smartcards, which may commonly be used in many applications, including contactless mobile payment systems (such as parking meters, vending machines, and merchant pay terminals), public transit fare cards, security access (such as to parking garages), and identity documents (such as ID cards and passports). NFC, a standardized open platform technology and a recent extension of RFID technology may be adopted for use in mobile electronic devices, such as cellular telephones (e.g., the target device 102). Short-range wireless data transmission by a mobile electronic device may also be accomplished by other means, such as Wi-Fi (802.11x), Bluetooth, or infrared coupling, according to one or more embodiments.

Figure 4A:
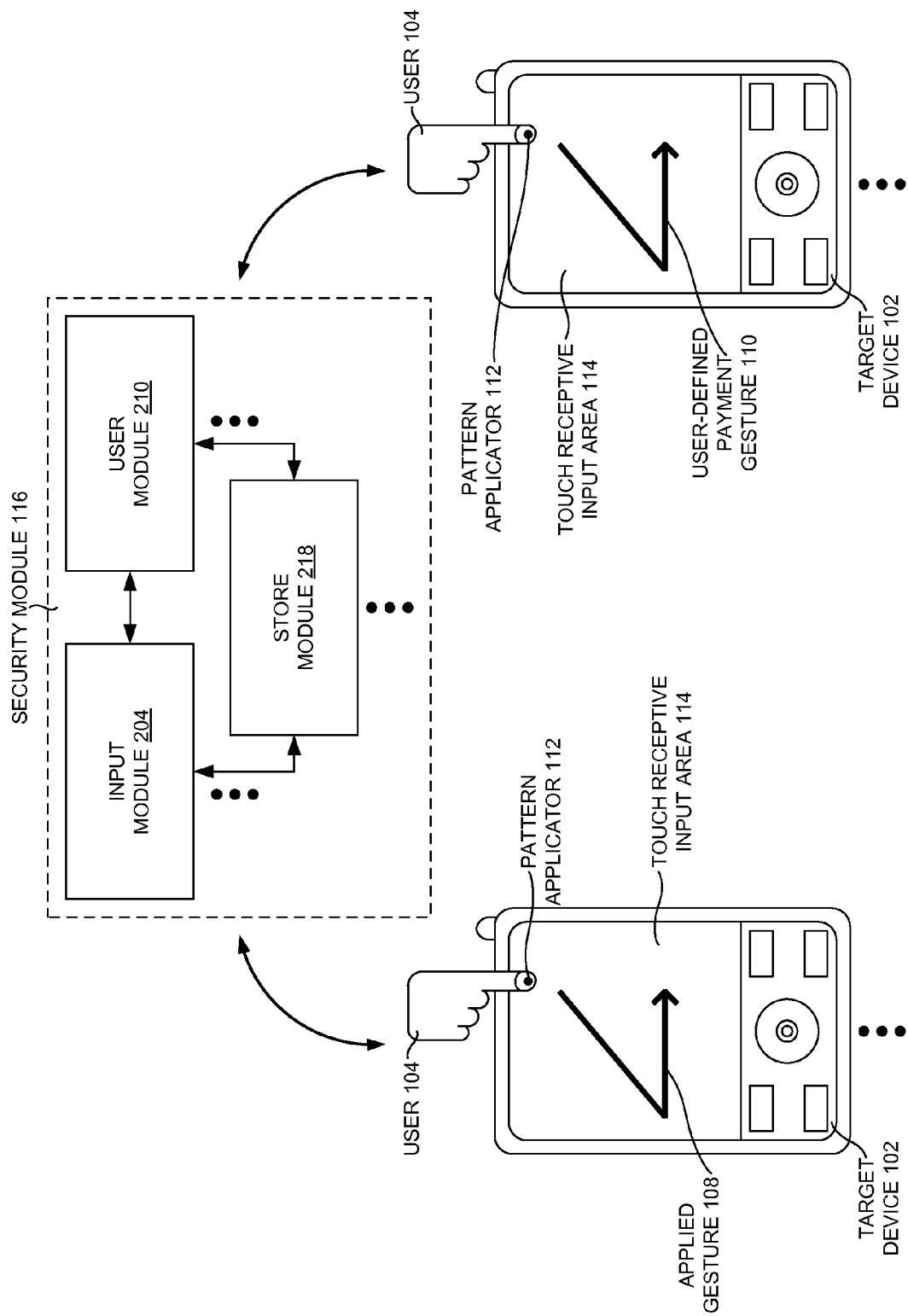
FIGS. 4A and 4B illustrate a schematic view of the storing of the user-defined payment gesture as the designated payment gesture and the matching of the applied gesture and the user-defined payment gesture to permit transmission of the protected payment data from the target device to the initiator device, according to one or more embodiments.
Figure 4B:
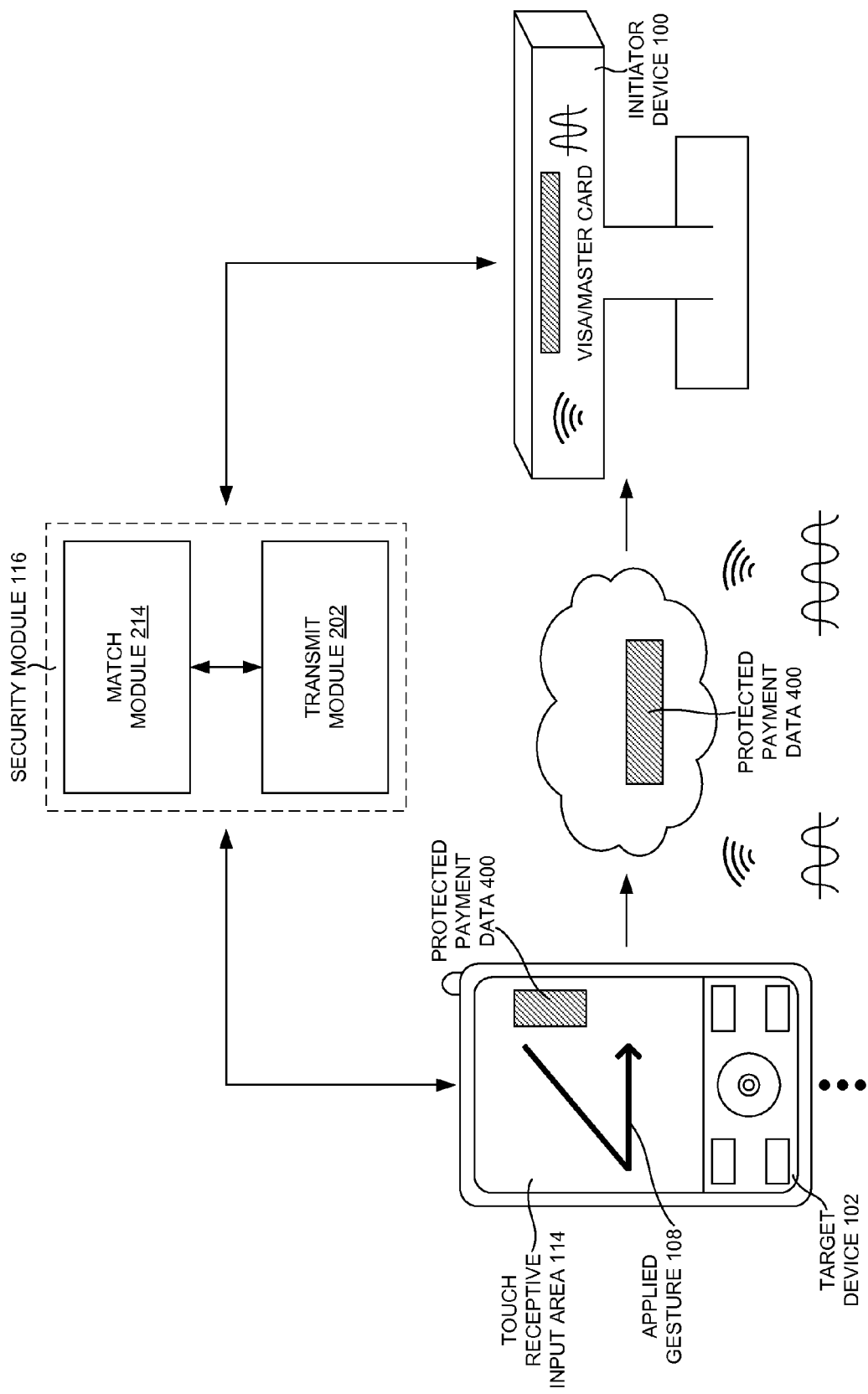
Figure 7A:
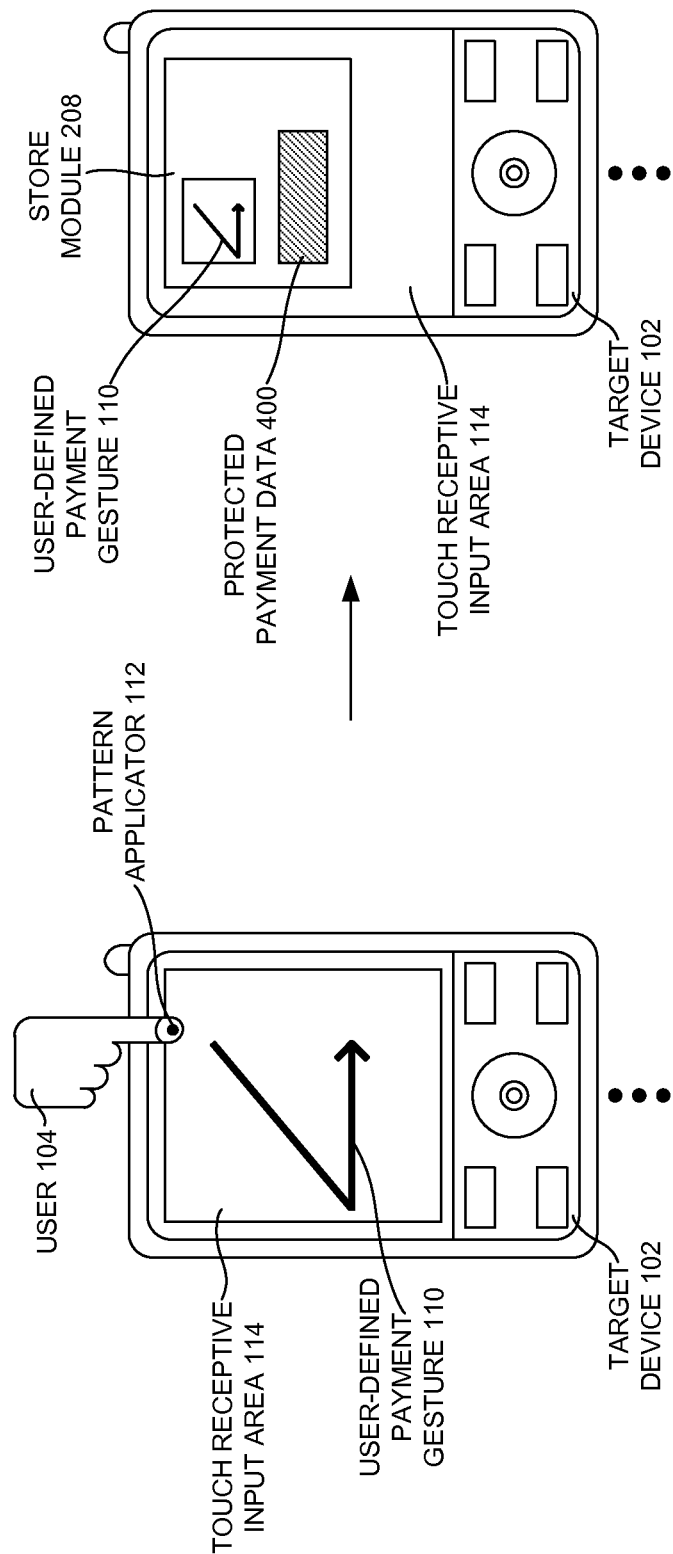
FIGS. 7A and 7B illustrate a schematic view of the storing of the user-defined payment gesture as the designated payment gesture and the matching of the applied gesture and the user-defined payment gesture to permit transmission of the protected payment data from the target device to the initiator device, according to one or more embodiments.
Figure 7B:
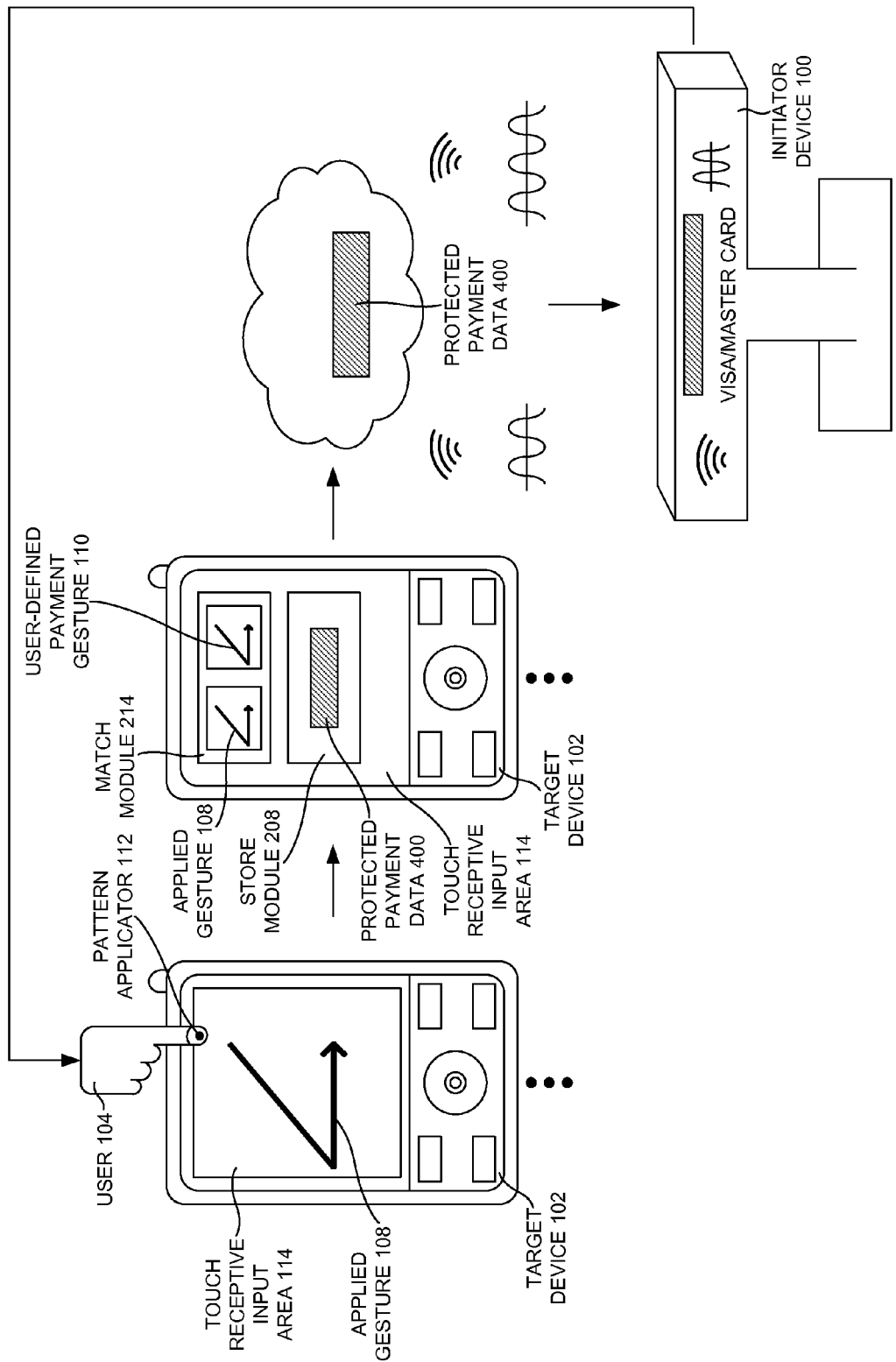

It should be noted that according to some embodiments, the wireless signal transmitted by the mobile electronic device may be in the form of an RF transmission (such as according to RFID, NFC protocols, Bluetooth or Wi-Fi standards) or other signals within the electromagnetic spectrum, such as a pulsed infrared emission (as illustrated in FIGS. 4B and 7B). The designated touch-sensitive input area (e.g., touch receptive input area 114) may be a display screen or may be another touch-sensitive area on the mobile electronic device, such a part of the housing (e.g., back or sides) of a target device 102 (which may be a mobile or cellular phone, or a tablet mobile electronic device like the Apple® iPad®), according to one or more embodiments.

It will be appreciated that according to an example embodiment, the method may comprise determining that an applied gesture 108 above a touch receptive input area 114 of a target device 102 is associated with a user-defined payment gesture 110 and comparing the applied gesture 108 above the touch receptive input area 114 of the target device 102 with a designated payment gesture defined by the user (e.g., the user-defined payment gesture 110) stored locally within the target device 102. According to one or more embodiments, the method may comprise permitting the wireless transmission of protected payment data 400 resident on the target device 102 to an initiator device 100 when the applied gesture 108 on the touch receptive input area 114 of the target device 102 matches the user-defined payment gesture 110 stored locally within the target device 102 and may comprise denying the wireless transmission of the protected payment data 400 resident on the target device 102 to the initiator device 100 when the applied gesture 108 on the touch receptive input area 114 of the target device 102 does not match the user-defined payment gesture 110 stored locally within the target device 102.

According to one exemplary embodiment, the NFC tag (e.g., an NFC technology based tag installed on either the target device 102 or the initiator device 100) may contain simple data or elaborate instructions that may enable them to perform the function of paying for goods, unlocking doors, launching phone calls or exchanging data (e.g., the protected payment data 400) and may also be read and rewriteable. According to one embodiment, the NFC tag may be custom-encoded by its manufacturer or may leverage the specifications that may be provided by the NFC Forum (an industry association charged with promoting NFC technology and setting key standards). The NFC tag (e.g., target device 102) may securely store personal data (such as user 104's bank account, debit card and/or credit card information) and may offer different communication speeds and capabilities in terms of configurability, memory, security, data retention and write endurance according to one or more embodiments.

According to another embodiment, the wireless transmission of the protected payment data 400 resident on the target device 102 to the initiator device 100 may be facilitated by magnetic induction between a loop antenna located within an electromagnetic field of the target device 102 and an another loop antenna located within another electromagnetic field of the initiator device 100 such that a strong inductive effect and a strong capacitive effect may be present in a near field region of an electromagnetic radiation that may emanate from the loop antenna and the another loop antenna thereby forming an air-core transformer. According to one exemplary embodiment, the NFC may be mediated by magnetic induction between two loop antennas located within each other's (target device 102 and initiator device 100) near field and may effectively form an air-core transformer. According to this embodiment, the NFC may operate within the globally available and unlicensed radio frequency ISM (Industrial, Scientific and Medical) band of 13.56 MHz and most of the RF energy may be concentrated in the allowed 14 kHz bandwidth range, but the full spectral envelope may be as wide as 1.8 MHz when using ASK (Amplitude-Shift Keying) modulation.

According to one embodiment, the radiation that may emanate from the loop antenna of the target device 102 and the another loop antenna of the initiator device 100 may form an air-core transformer. A physical core may not be necessary and a functioning air-core transformer may be produced by placing the windings (e.g., the loop antennas) near each other. The air which comprises the magnetic circuit may be essentially lossless. Thus, the air-core transformer may eliminate loss due to hysteresis in a core material. Such a design may have a high bandwidth capability and may be employed in RF applications for which a satisfactory coupling coefficient may be maintained by overlapping the primary and secondary windings (e.g., the loop antenna of the target device 102 and the another loop antenna of the initiator device 100), according to one or more embodiments.

The target device 102 may, at least according to one embodiment, operate in a passive communication state such that the initiator device 100 provides the electromagnetic field and the target device 102 answers by modulating the another electromagnetic field during which the target device 102 draws its operating power from the electromagnetic field provided by the initiator device 100. It may be that, according to one embodiment, the target device 102 may operate in an active communication state such that both the target device 102 and the initiator device 100 are self-powered and communicate by alternatively generating their own electromagnetic fields and deactivating their RF fields before the target device 102 transmits the protected payment data resident 400 on the target device 102 to the initiator device 100.

Furthermore, it will be appreciated that according to one embodiment, the target device 102 may operate in an emulation state such that the target device 102 permits the wireless transmission of the protected payment data 400 resident on the target device 102 to the initiator device 100 when the applied gesture 108 on the touch receptive input area 114 of the target device 102 matches the user-defined payment gesture 110 stored locally within the target device 102. It should also be noted that, according to one or more embodiments, the target device 102 may consist of a device dedicated for the purpose of enabling wireless transmission of protected payment information (e.g., a credit card-sized device with a built-in touch sensitive input area) or may be included within or as part of another mobile electronic device (such as a mobile phone, mobile media player, or tablet computer).

According to another embodiment, the target device 102 may operate in a reader state such that the target device 102 reads a request from the initiator device 100 for the wireless transmission of the protected payment data 400 resident on the target device 102 to the initiator device 100. The target device 102 may also operate in a P2P state such that the target device 102 reads a request from the initiator device 100 for the wireless transmission of the protected payment data 400 resident on the target device 102 to the initiator device 100 and permits the wireless transmission of the protected payment data 400 resident on the target device 102 to the initiator device 100 if the applied gesture 108 on the touch receptive input area 114 of the target device 102 matches the user-defined payment gesture 110 stored locally within the target device 102, according to one or more exemplary embodiments. It should also be noted that, according to one or more embodiments, the target device 102 may permit entry of the applied gesture 108 above the touch receptive input area 114 of the target device 102 prior to and in anticipation of a request from the initiator device 100 for the wireless transmission of the protected payment data 400 resident on the target device 102 to the initiator device 100.

In one exemplary embodiment, a mobile electronic device (e.g., a target device 102) may be in an initial secure state, wherein no protected data is transmitted. When the device is brought in proximity to and is interrogated by an external reader (e.g., the initiator device 100), the mobile device may prompt the user to enter a tactile gesture (e.g., the user-defined payment gesture 110) above a touch-sensitive input area 114. The applied gesture 108 may be compared with a reference gesture (e.g., the designated payment gesture), which may have been previously defined by the user and stored on the mobile device (e.g., as the user-defined payment gesture 110). If the input gesture is sufficiently similar to the stored reference gesture, the mobile electronic device may transmit, or may allow to be transmitted, the requested information (e.g., the protected payment data 400) to the reader (e.g., the initiator device 100). If the input gesture is not sufficiently similar to the stored reference pattern, then the mobile electronic device is prevented from transmitting the requested information, according to one exemplary embodiment.

In another embodiment, following entry and confirmation of the designated payment gesture defined by the user (e.g., the user-defined payment gesture 110), the mobile electronic device (e.g., the target device 102) may enter a state in which it may now permit passive interrogation by an external reader (e.g., the initiator device 100) and may allow transmission of the requested information (e.g., the protected payment data 400). The protected data 400 may be transmitted once, and the device may reenter the secure state. In another implementation, the mobile electronic device, once authorized, may enter a state in which it may permit interrogation by an external reader and may allow data transmission for only a limited time period (e.g., ten seconds) and/or for a limited number of events (e.g., three interrogation attempts) before re-entering the secure state, in which no information is permitted to be transmitted.

Figure 7C:
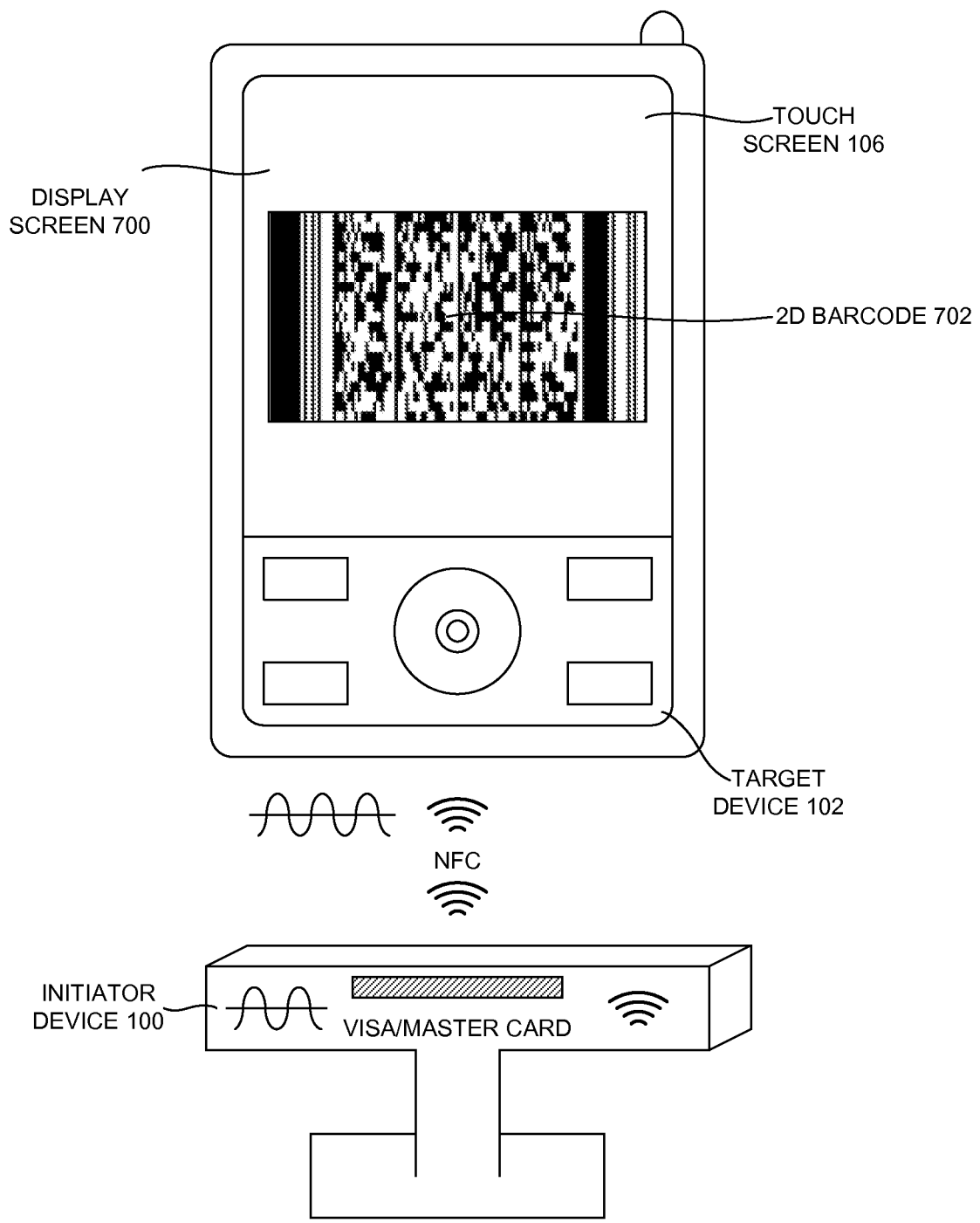
FIG. 7C illustrates protected payment information that may be wirelessly communicated from a target device to an initiator device as a radiofrequency transmission, as an encoded optical pulse, or as a spatially encoded optical emission in the form of a one-or-two-dimensional barcode which may then be read by an optical scanner of the initiator device, according to one or more embodiments.

According to an example embodiment, the wireless transmission of the protected payment data 400 from the target device 102 to the initiator device 100 may occur within another regime of the electromagnetic spectrum other than that employed by radiofrequency devices. In another embodiment, the wireless transmission of the protected payment data 400 may occur via modulation of an encoded visible or infrared light signal (as illustrated in FIGS. 4B, 7B and 7C). In one implementation, when a user-defined payment gesture is entered on the touch receptive input area 114 of the target device 102 in response to or in anticipation of interrogation by an initiator device 100, a spatially encoded optical pattern in the form of an encoded optical emission containing the protected payment data 400 may be emitted by the target device 102. Such an encoded optical emission may be in the form of a one or two dimensional barcode 702 depicted on a display screen 700 of the target device 102, which may then be read by an optical scanner of a proximate initiator device 100 (as illustrated in FIG. 7C). In another embodiment, the protected payment data 400 may be transmitted by the target device 102 as a temporally encoded stream of light pulses (such as by a light emitting diode (LED), for example, in the infrared spectrum), which may be detected by the initiator device 100 by means of an optical sensor. According to one embodiment, this light-based wireless transmission of the protected payment data 400 may substitute for or augment simultaneous wireless transmission of protected payment data 400 via NFC radiofrequency modulation. An advantage of the optical-based wireless transmission of the protected payment data 400 may be a decreased susceptibility to eavesdropping or interception of transmitted electronic signals, as transmission of optically encoded information between uncoupled devices generally requires line-of-sight, as well as close proximity.

It should be noted that, according to one embodiment, the initiator device 100 may be a remote computer server operating through a wide area network and according to yet another embodiment, the target device 102 may be a mobile electronic device (e.g., a mobile phone, a mobile media player, a tablet computer, an Apple® iPhone®, an Apple® iPad®, a Google® Nexus S®, a HTC® Droid® etc.). It should also be noted that the initiator device 100 may be an external reader or another interrogating device, such as for a contactless payment system (e.g., a merchant pay terminal, parking meter, or vending machine), according to one or more exemplary embodiments. In addition, the initiator device 100 may be another mobile electronic device such as a portable pay terminal carried by a waiter or store salesperson, or may be even be a mobile phone (e.g., Apple® iPhone®) or a tablet computer (e.g., an Apple® iPad®), according to one or more embodiments.

FIG. 2 illustrates a security module 116, according to one or more embodiments. The security module 116 may perform all the tasks and functions associated with current and future embodiments and may contain an NFC module 200. It may also contain an input module 204 for accepting an applied gesture 108 as the user input (from example, user 104), a user module 210 that keeps track of particular users who are using the target device 102 and a communications module 206 (for wireless transmission of the protected payment data 400 from the target device 102 to the initiator device 100 e.g.), according to one or more embodiments. According to another embodiment, the security module 116 may also contain a store module 208 (e.g., to store the user-defined payment gesture 110 as the designated payment gesture), a gesture module 218, a compare module 212 (to compare the applied gesture 108 to the user-defined payment gesture 110 stored as the designated payment gesture), a match module 214 (to match the applied gesture 108 to the user-defined payment gesture 110 stored as the designated payment gesture), an authorize module 216 (to permit or deny the wireless transmission of the protected payment data 400 from the target device 102 to the initiator device 100), a transmit module 202 (to transmit the protected payment data 400 from the target device 102 to the initiator device 100), and a access module 220. The different modules mentioned herein may perform all the tasks and functions associated with the present invention independently or in collaboration with other modules described herein, according to one or more embodiments.

FIG. 3 illustrates a table view according to one or more embodiments. If the initial state 302 of the target device 102 is locked and the input gesture 304 (e.g., applied gesture 108) matches the designated payment gesture 306 defined by the user (e.g., the user-defined payment gesture 110), a wireless transmission of the protected payment data by target device 308 is permitted from the target device 102 to the initiator device 100. The opposite is true if the input gesture 304 does not match the user-defined payment gesture 110 (e.g., the input gesture 304), according to one or more embodiments. Then, the wireless transmission of protected payment data by target device 308 is denied. Similarly, and according to one embodiment, if the initial state 302 is in an operating state (i.e., the target device 102 is operational and ready to communicate with the initiator device 100), and the applied gesture 108 matches the user-defined payment gesture 110 (i.e., the input gesture 304 of FIG. 3 matches the designated payment gesture 306), the wireless transmission of protected payment data by target device 308 is permitted between the initiator device 100 and the target device 102 (or the target device 102 permits interrogation by the initiator device 100). The opposite is true and the wireless transmission of protected payment data by target device 308 is denied if the applied gesture 108 (i.e., input gesture 304) does not match the user-defined payment gesture 110 (i.e., the input gesture does not match the designated payment gesture 306), according to one or more embodiments.

FIGS. 4A and 4B illustrate the functioning of specific modules within the security module 116 to wirelessly transmit the protected payment data 400 to the initiator device 100. A user 104 may perform an applied gesture 108 using a pattern applicator 112 on a touch receptive input area 114 of a target device 102 (e.g., a mobile phone equipped with a touch receptive touchscreen). According to one embodiment, the applied gesture 108 may then be stored locally within the target device 102 as a user-defined payment gesture 110. Subsequently, and according to one embodiment, if another applied gesture 108 (as shown in FIG. 4B) matches the user-defined payment gesture 110, the protected payment data 400 is wirelessly transmitted to the initiator device 100, according to one embodiment.

According to one embodiment, the present invention may employ a passive communication mode. In this mode, the initiator device 100 may provide a carrier field and the target device 102 may answer by modulating the existing field and may draw its operating power from the initiator-provided electromagnetic field, thus making the target device 102 a transponder. According to another embodiment, the prevent invention may employ an active communication mode where both the initiator device 100 and the target device 102 may communicate by alternately generating their own fields. One device (either the target device 102 or the initiator device 100) may deactivate its RF field while it waits for data (e.g., protected payment data 400). In this mode, both devices may have their own power supplies. In another embodiment, the target device may operate in a battery-assisted passive mode.

The initiator device 100 and the target device 102 may employ two or more different types of coding to transfer data (e.g., the protected payment data 400), according to one or more embodiments. If an active device (e.g., target device 102) transfers the protected payment data 400 at 160 Kbit/s, a modified Miller coding with 100% modulation may be used. In other cases, according to other embodiments, Manchester coding may be used with a modulation ratio of 10%. It may also be that some target devices and initiator devices (such as target device 102 and initiator device 100) may not be able to receive and transmit the protected payment data 400 at the same time. Thus, these devices may check the RF field and may detect a collision if the received signal matches the transmitted signal's modulated frequency band, according to one or more embodiments.

It may be that the target device 102 may be a mobile phone or a mobile electronic device capable of sending and receiving data, according to one embodiment. There may be several uses for NFC technology employed in the present invention (according to the NFC Forum) according to at least three exemplary embodiments. The first method may employ a reader/writer mode wherein the initiator device 100 may be active and may read a passive RFID tag (e.g., a smart poster, a smart card, an RFID tag implanted within a target device 102 etc.). The second method may employ a P2P mode wherein the target device 102 and the initiator device 100 may exchange data (e.g., virtual business cards, digital photos, protected payment data 400 etc.). Lastly, the third method may employ a card emulation mode wherein the target device 102 and the initiator device 100 may behave like an existing contactless card and may be used with existing technology infrastructures according to one or more embodiments.

Figure 5:
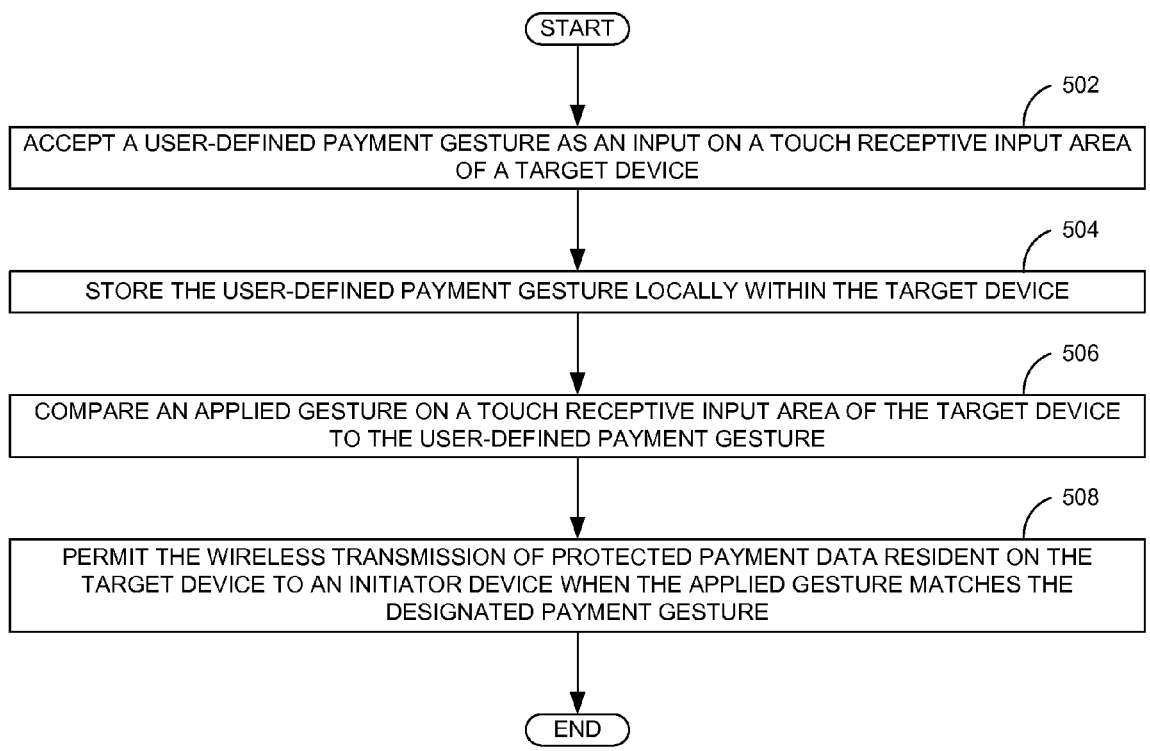
FIG. 5 is a flow chart illustrating accepting, storing, and comparing a gesture to permit wireless transmission of protected payment data from a target device to an initiator device according to one or more embodiments.
Figure 6:
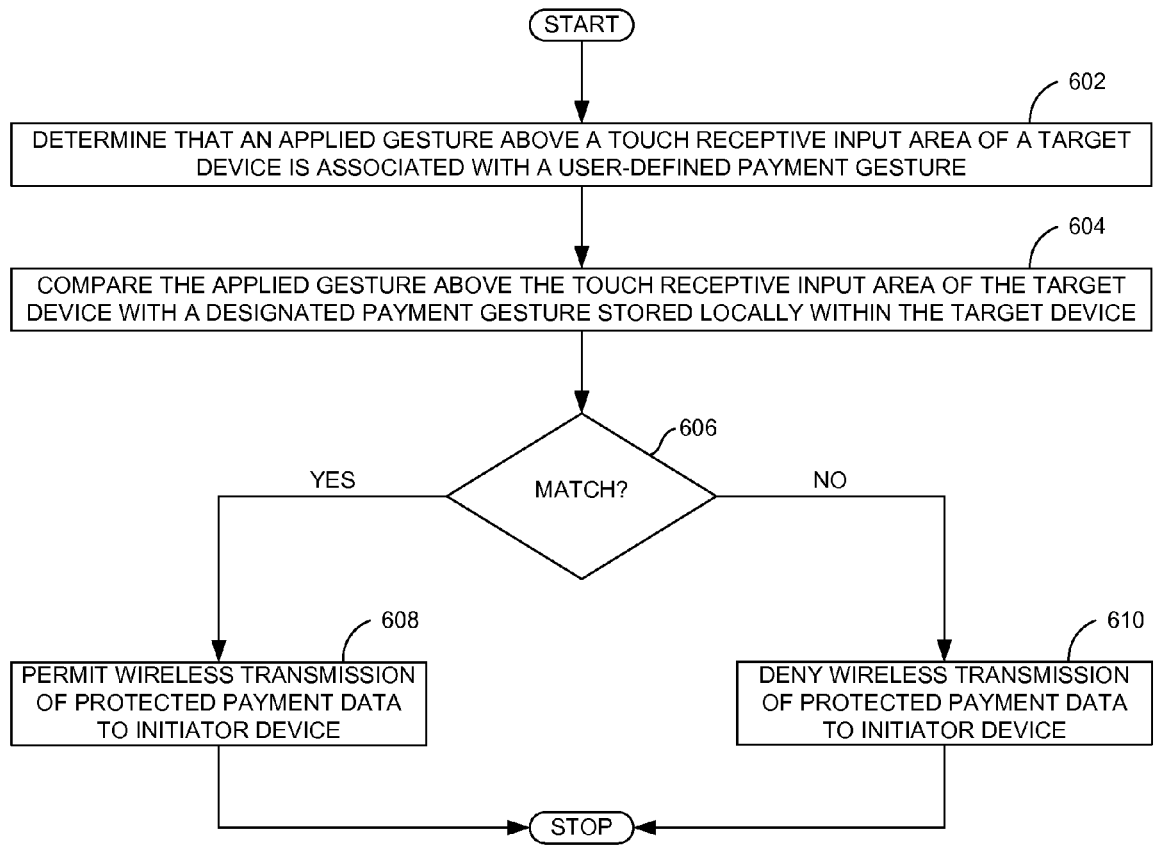
FIG. 6 is a flow chart illustrating accepting, storing, and comparing a gesture to permit wireless transmission of protected payment data from a target device to an initiator device according to one or more embodiments.

FIG. 5 and FIG. 6 are flow charts illustrating the method involved in the wireless transmission of the protected payment data 400 from the target device 102 to the initiator device 100, according to one or more embodiments. The method may include accepting a user-defined payment gesture 110 as an input (e.g., applied gesture 108) on a touch receptive input area 114 of a target device 102 and storing the user-defined payment gesture 110 locally within the target device 102. According to one embodiment, an applied gesture 108 on a touch receptive input area 114 of the target device 102 may be compared to the user-defined payment gesture 110 (e.g., by using the compare module 212 of FIG. 2). The method may permit the wireless transmission of protected payment data 400 resident on the target device 102 to an initiator device 100 when the applied gesture 108 on the touch receptive input area 114 (e.g., the touchscreen 106) of the target device 102 matches the designated payment gesture (e.g., the user-defined payment gesture 110) stored locally within the target device 102, according to one embodiment. If the applied gesture 108 on the touch receptive input area 114 of the target device 102 does not match the user-defined payment gesture 110 stored locally within the target device 102, the wireless transmission of the protected payment data 400 from the target device 102 to the initiator device 100 is denied, according to one exemplary embodiment. According to one exemplary embodiment, a user may manually initiate transmission of the protected payment data 400 directly to the initiator device 100, without the target device 102 being interrogated by the initiator device 100.

FIG. 7A schematically illustrates the storing of the protected payment data 400 and the user-defined payment gesture 110 locally within the target device 102 using the store module 208 of FIG. 2, according to one embodiment. According to another embodiment as schematically illustrated in FIG. 7B, the applied gesture 108 is matched with the user-defined payment gesture 110 using the match module 214 of FIG. 2 and if there is a match between the applied gesture 108 and the user-defined payment gesture 110 (i.e., the designated payment gesture defined by the user), the protected payment data 400 (resident on the target device 102 using store module 208 of FIG. 2) is wirelessly transmitted to the initiator device 100, according to one exemplary embodiment. It will be appreciated that the initiator device 100 may make a request for the above mentioned wireless transmission of protected payment data 400 (to be sent to the initiator device 100) directly to the target device 102, according to one embodiment. FIG. 7C illustrates an optical payment pattern that may be in the form of a one or two dimensional barcode 702 depicted on the display screen 700 of the target device 102, which may then be read by an optical scanner of a proximate initiator device 100, according to one or more exemplary embodiments. Also illustrated in FIG. 7C, the protected payment data 400 may be wirelessly transmitted by means of an encoded pulse sequence (which may be, for example, within the infrared spectrum) emitted by the target device 102, which may be read by a detector of an initiator device 100, according to one or more embodiments.

According to one or more embodiments, the user-defined payment gesture 110 may be entered on the target device 102 prior to and in anticipation of interrogation (i.e., a request from the initiator device 100 to the target device 102 for the wireless transmission of protected payment 400 resident on the target device 102 to be sent to initiator device 100) by the initiator device. It may also be that the pre-entry of the user-defined payment gesture 110 may be application specific to an application resident on the target device (e.g., a Wells Fargo® mobile banking application, a Bank of America® mobile banking application, a Chase® mobile banking application etc.), according to one or more embodiments. In one example embodiment, the personal user settings may be such that no entry of a payment gesture (e.g., the user-defined payment gesture 110) is required to enable wireless transmission of the payment data (e.g., protected payment data 400) in response to interrogation by an initiator device 100, if the application is a payment facility and the initiator device 100 is a pay terminal associated with a parking meter, while in another example embodiment, if the application is a credit card payment system, the personal user settings may require entry of a payment gesture to enable wireless transmission of the payment data. In addition, the target device 102 may be configured under a user setting (e.g., user 104) such that the application resident on the target device 102 may be required to prompt the user 104 to enter the user-defined payment gesture 110 prior to enabling the wireless transmission of the protected payment data 400 in response to interrogation by the initiator device 100 while an another application resident on the target device 102 (e.g., a Starbucks® Mobile App.) may be permitted to wirelessly transmit the protected payment data 400 in response to interrogation by the initiator device 100 without specific authentication of the user-defined payment gesture 110 by user 104, according to one or more exemplary embodiments embodiment.

According to other embodiments, pre-entry of the user-defined payment gesture 110 may be application-specific. For example, a user may launch an application on his/her mobile electronic device relating to a coffee-house contactless payment system while waiting in line to order a drink, enter a user-defined payment gesture 110, and, provided the gesture is authenticated, the protected payment data 400 may be permitted to be wirelessly transmitted when subsequently queried by a payment system reader (e.g., the initiator device 100). In one implementation, the target device 102 may be configured under a user's preference settings such that specific applications may be required to prompt the user to enter the user-defined payment gesture 110 prior to enabling wireless transmission of a signal in response to interrogation by an external reading device (such as the initiator device 100), while with other applications, the device may be allowed to transmit a signal without specific authentication. For example, a user may not want to bother entering a user-defined payment gesture 110 every time he or she uses the device to pay for frequent and/or low-value transactions (such as paying a parking meter or unlocking a car door), but may wish to require an additional level of security when engaging in more important or high-value events (such as paying for gasoline, entering a secure building, or transmitting a home address), according to one or more exemplary embodiments.

In another variation, the user-defined payment gesture 110 may be entered on the target device 102 prior to and in anticipation of interrogation by an external reader. If the applied gesture 108 is properly recognized, then the target device 102 may be transformed into a state in which transmission of information requested by the initiator device 100 may be permitted under certain conditions, e.g., if an external query is received by the mobile device within a finite time period (e.g., 30 seconds) from the time the applied gesture 108 is authenticated. For example, in this embodiment, a user may enter the user-defined payment gesture 110 while walking up to the RFID reader (e.g., initiator device 100) of a locked door or subway turnstile.

The initiator device 100 may be a reader for a contactless payment system, a card reader governing access to a restricted area (such as a secured building or garage), or a system for restricting access to ticketed customers (such as a transit system, theater, or stadium), according to one or more embodiments. The initiator device 100 may be another mobile electronic device. For example, an associate may request that a user transfer his/her contact information (or electronic business card) from his/her cellular phone to a portable media player using an information exchange application. In this implementation, the user's target device 102 (e.g., the user's mobile phone) would only permit transmission of the requested information following verification of the authentication gesture, according to one or more exemplary embodiments. According to another embodiment, if the mobile device is reported lost or stolen by its owner and/or its authorized user, a remote computer server may send a de-authorizing or de-activating signal to the target device 102 preventing transmission of all requested data in response to query by an initiator device 100, whether or not granting of permission would be required for that function under the user's preference setting.

According to another embodiment, the target device 102 may enter a state that may permit a finite number of wireless transmissions (e.g., two transmissions) of the protected payment data 400 resident on the target device 102 in response to interrogation by the initiator device 100 if the applied gesture 108 on the touch receptive input area 114 of the target device 102 matches the user-defined payment gesture 110 stored locally with the target device 102 before entering a secure state. Further, and according to one embodiment, the target device 102 may permit interrogation by the initiator device 100 and may allow for the wireless transmission of the protected payment data 400 resident on the target device 102 within a finite time period (e.g., twenty seconds) if the applied gesture 108 on the touch receptive input area 114 of the target device 102 matches the user-defined payment gesture 110 stored locally with the target device 102. Finally, it will be appreciated that a remote computer server may send a deactivating signal to the target device 102 that may prevent the wireless transmission of the protected payment data 400 in response to interrogation by the initiator device 100 if the target device 102 is reported at least one of being lost, stolen, cloned and otherwise compromised by user 104 of the target device 102.

In another embodiment, there may be various rules/references that may enable the user 104 to unlock the target device 102 through the use of tactile patterns or security gestures applied on the touch screen 106 or touch-receptive non-display input regions 114 of the target device 102. The applied gesture 108 may be the gesture that may be accepted after determining the match between the user-defined payment gesture 110 and applied gesture 108 that may be under matching conditions (e.g., may be approximate). The rejected gestures may be the gestures that may be rejected after determining the match between the user-defined payment gesture 110 and the applied gesture 108 may not be within the matching conditions.

According to one or more embodiments, a gesture 108 applied above the touch receptive input area 114 of a target device 102 may fail to be recognized as the user-defined payment gesture 110 stored locally within the device for a number of reasons, for example because: it is the wrong gesture; the applied gesture 108 is insufficiently similar to the stored reference gesture; the criteria for matching the applied and stored gestures are too stringent; or there is a failure in gesture detection, recognition, characterization, communication, storage, retrieval, or analysis. In one embodiment, if recognition of the applied gesture 108 as the user defined payment gesture 110 fails after a predetermined number of attempts (for example, three), then the target device 102 may prompt the user 104 to employ an alternative form of authentication, such as typing an alphanumeric password on a miniature keyboard or on a virtual keyboard on the touch screen 114 of the mobile device (for example, the target device 102); if the entered password is correct, then the target device 102 may be permitted to wirelessly transmit protected payment data 400 upon interrogation by the initiator device 100. According to another embodiment, an alternative method of authorization requested by the target device 102, if the applied gesture 108 does not match the stored user-defined payment gesture 110, may be in the form of biometric authentication of the user 104, such as by means of facial recognition or fingerprint analysis. It will be appreciated that if the applied gesture 108 does not match the stored user-defined payment gesture 110, then the target device 102 may be permitted to transmit protected payment information 400 by means of authorization communicated from a remote computer server, if the user 104 contacts a central office (for example, by telephone or text messaging), where verbal authentication can be performed by a representative of the payment service, according to yet another embodiment.

In an example embodiment, an applied gesture 108 may comprise a tactile pattern consisting of application by a pattern applicator 112 within a designated touch-sensitive input area 114 of an arbitrarily complex spatial or temporal pattern of tactile forces. The tactile pattern of the applied gesture 108 may consist of one or more simultaneous or sequential point or vector tactile forces. A vector tactile force may consist of directional linear or complex curvilinear components. The gesture may include a temporal element. For example, the applied gesture 108 may include linear applications of force by the pattern applicator 112 across the touch screen 106, taps against the touch screen 106, taps against a touch receptive input area 114, static applications of the pattern applicator 112 in proximity with the touch screen 106 for a specified period of time, or any combination thereof. The applied gesture 108 may be composed by the authorized user of the mobile device 102.

The applied gesture 108 may be applied with or without the aid of a visual template. The designated input region may represent a fixed or variable subset of the touch screen 106 or may coincide with the entire touch screen 106 (or touch receptive input area 114), according to one embodiment. In another embodiment, the applied gesture 108 may be applied on a touchscreen 106 comprising a visual template. The visual template may comprise multiple distinct dotted locations and/or dotted-patterning. The visual template may be a matrix visual template. According to an exemplary embodiment, the applied gesture 108 applied or path traced by one's finger or pattern applicator may or may not be visually indicated on the screen, and successful or unsuccessful application of the gesture may or may not be acknowledged by specific visual, audible, or haptic feedback. In one example embodiment, the applied gesture may be applied physically by touching a pattern applicator (e.g., two fingers) directly to, on, onto, or against a touch receptive input area 114, but may also mean performing a gesture above, over, or in very close proximity to a touch receptive input area 114, without necessarily making actual physical contact with the touch receptive input area 114 (e.g., hovering).

According to one embodiment, the applied gesture 108 may be applied dependent or independent of its relative scale or position within the designated input region of the touch screen 106 (or touch receptive input area 114). The length and width of a two-dimensional spatial pattern performed on the surface of the touch screen 108 may or may not vary in magnitude between different applications by a user or different users. The location of the touch screen 106 (or touch receptive input area 114) on which the two-dimensional spatial pattern is performed by the user may or may not vary. Nevertheless, the two-dimensional spatial pattern may unlock the target device 102 or may permit acceptance of a payment gesture if the ratio of the dimensions of the length and width of the two-dimensional spatial pattern are substantially similar to the ratio of the length and width of the tactile pattern of the applied gesture 108.

According to one example embodiment, the designated payment gesture may consist of a "forward double-L," applied by simultaneously moving two adjacent fingers vertically down on a touch screen 106 (or touch receptive input area 114) a distance x and then contiguously moving both fingers ninety degrees to the right a distance of 0.5x. The applied gesture 108 may or may not be scale and position independent with respect to the designated input region or the touch screen 106 (or touch receptive input area 114), according to one embodiment. According to another embodiment, the size of the applied gesture 108 may be small, medium, or large relative to the size of the touch receptive input area 114. The applied gesture 108 may be applied anywhere (e.g., in the top left quadrant or anywhere on the right side) on the target device 102, according to one exemplary embodiment.

According to another example, the user 104 may compose the applied gesture 108 consisting of the approximately simultaneous application on a touch screen 106 (or touch receptive input area 114) of three equally-spaced point contacts arrayed linearly in a horizontal orientation. These three point touches may be applied near the top or anywhere else within the touch receptive input area 114 and may be relatively small or large compared to the size of the designated input region of the target device 102.

According to yet another example, the applied gesture 108 may be applied with a force applicator (e.g., a stylus) on the touch screen 106 (or touch receptive input area 114) followed by holding the object in contact with the touch screen 106 (or touch receptive input area 114). According to one embodiment, a tactile gesture may be applied at any location within a designated touch-sensitive input area 114 of a target device 102. The designated input region may be a touch screen 106 or some other touch-sensitive non-display input region 114 of the target device 102, such as its back, an edge, a bezel, or a touch pad. The scale of the applied gesture 108 may be of any size relative to the designated input region of the touch screen 106 or touch-sensitive non-display input region (e.g., the touch receptive input area 114) of the target device 102, according to one embodiment.

FIG. 8 illustrates a table view of different associated payment data that may be resident on the user's target device 102 as different methods of payment for a given transaction, according to one or more embodiments. According to one example, different user-defined payment gestures may be associated with protected payment data related to different financial accounts of the user 104. In one embodiment, depending on which of a plurality of valid payment gestures (e.g., user-defined payment gesture 110 or any other designated payment gesture) is applied to the touch receptive input area 114 of the target device 102, different protected payment data (as shown in FIG. 8) may be wirelessly transmitted to an interrogating initiator device (e.g., initiator device 100). For example, if user-defined payment gesture "A" is entered, then the protected payment data associated with the user's credit card "A" may be transmitted, whereas if a different user-defined payment gesture "B" is applied (as the applied gesture 108), then the protected payment data associated with user's debit card "B" may be transmitted to the initiator device 100, according to one embodiment. Alternatively, if user-defined payment gesture "C" is entered, then the protected payment data pertaining to the joint checking account of the user and his/her spouse may be wirelessly transmitted upon interrogation by the initiator device 100, while if user-defined payment gesture "D" is applied, then the protected payment data related to the user's company credit card may be released for wireless transmission to the initiator device 100, according to one embodiment. According to these exemplary embodiments, a unique user-defined payment gesture 802 may be any one of an applied gesture 108, a simultaneous applied gesture, an another gesture, a sequential applied gesture, and a hold/simultaneously applied gesture (any one of which could be user-defined payment gesture 110) as illustrated in FIG. 8. According to other embodiments, the associated payment data 804, transmitted as protected payment data 400 could be a plurality of a credit card, a charge card, a store credit card, a checking account number, and a debit card number according to one more exemplary embodiments and as illustrated in FIG. 8.

It will be appreciated that, according to one embodiment, the user 104 may use a master user-defined payment gesture and may apply this master gesture on the touch receptive input area 114 of the target device 102 in anticipation of interrogation by the initiator device 100. If and when the applied gesture matches the master user-defined payment gesture, the target device 102 may enter a state in which a plurality of possible payment options may become available to select for wireless transmission upon interrogation by the initiator device 100, according to one embodiment. For example, the user 104 may unlock and/or enable a plurality of payment options on the target device 102 by entering a single master payment gesture and then may choose which card and/or account to use at an NFC-enabled payment terminal (i.e., the initiator device 100) by selecting particular protected payment data 400 to send to the initiator device 100. For example, a user 104 may approach a pay terminal at a Safeway® store with a target device 102 in hand with a general e-payment screen open with icons for a Starbucks® prepaid account, a Wells Fargo® debit card, an AmEx® charge card, and VISA® 1, VISA® 2, and MasterCard® credit cards displayed on the touchscreen 106. It may be that, according to one embodiment, some of the payment options (e.g., the credit cards) initially may be grayed out and inactive, while some other payment options (e.g., a Starbucks® card) may be selectable by the user 104 without entry of a payment gesture. Once the user-defined payment gesture 110 is entered and validated, additional or all of the payment options displayed on the touchscreen 106 may then become active, and the user 104 may then select which one to use (i.e., which set of protected payment data to wirelessly transmit to the initiator device 100) once the target device 102 is brought in proximity to the merchant pay terminal (i.e., initiator device 100), according to one or more embodiments.

The target device 102 may operate under a set of one or more user-defined parameters, according to one or more embodiments. According to one or more embodiments, the user-defined parameters may include the specific application operating on the target device 102 (e.g., no user-defined payment gesture 110 may be required when using the Starbucks® application, but one may be required when using the Chase® mobile banking application); the nature of the initiator device (e.g., no user-defined payment gesture 110 may be required to be entered if the initiator device 100 is a parking meter or a vending machine, but one may be required if the initiator device 100 is a gas pump or department store NFC reader); the identity of the initiator (e.g., no user-defined payment gesture 110 may be required if the initiator device 100 is a Starbucks® NFC payment terminal, whereas one may be required if the initiator device 100 is a Chevron® gas pump); and the value of the requested payment or the transaction amount (e.g., no user-defined payment gesture 110 may be required to be entered on the target device 102 if the transaction is ten dollars or less, whereas one may be required for any transaction amount over ten dollars); or any combinations thereof. According to an example embodiment, if the target device 102 is reported lost, stolen, cloned, or otherwise compromised by its owner or authorized user, a central remote computer server may send a de-authorizing signal to the target device 102 preventing wireless transmission of the protected payment data 400 in response to interrogation by the initiator device 100, whether or not granting of permission may be required for that function under the user-defined parameters.

According to another embodiment, a user 104 may make a payment to another user by tapping the target device 102 with another target device of another user and entering the amount of money to be transferred. It may be that the target device 102 may enable delivery of in-store promotions and couponing, driving sales of products or value-added services and may even enable consumers to gain more information on retailers and specific products. The target device 102 may serve as a replacement for physical car keys, house/office keys, and hotel room keys (employing haptic gesturing technology and RFID/NFC technology). As such, the target device 102 and the initiator device 100 may be used by hotels and rental car companies to provide VIP service to customers. In corporate settings, the target device 102 and the initiator device 100 may control access to facilities and computer networks while also authenticating users.

According to another embodiment, ubiquitous information applications, such as audio tour guides for art museums or public monuments, book sales and lending, movie trailers, DVD rentals, and music purchases may employ the gesturing technology of the target device 102 and the initiator device 100. Users may touch the NFC enabled target device 102 to smart posters or tagged items to hear marketing information to view or hear media (while retaining the flexibility to safeguard the information resident on the target device 102—for example, the protected payment data 400). Health and safety applications such as water monitoring, diet, diabetes, blood pressure, and alcohol consumption monitoring, home healthcare visits, and campus safety check-ins may also use the methods described herein, at least according to one or more exemplary embodiments. In this scenario, the target device 102 and the initiator device 100 may be paired with other devices to provide consumers with personalized services and facilitate exchange of encrypted private data to doctors or other healthcare workers (in this example, the patient's personal, sensitive, and confidential healthcare information may be akin to a person's personal, sensitive, and confidential financial or bank account information such as the protected payment data 400 described in the above embodiments), according to one embodiment.

It will be appreciated that the functions of the present embodiments described herein may be applied to a social networking environment wherein users may exchange contacts, resumes, and location-based personal networks using an NFC-enabled target device 102. A user may alert friends to his/her location, check into commercial establishments to gain rewards, and may rate products and services in real-time. In addition, and according to another embodiment, a user may use an NFC-enabled target device 102 to participate in multiplayer games, create and track challenges and participate in urban games.

An NFC-enabled target device 102 and initiator device 100 may be used to configure and initiate other wireless network connections such as Bluetooth, Wi-Fi or Ultra-wideband. The NFC technology described in the above embodiments may be an open platform technology standardized in ECMA-340 and ISO/IEC 18092. These standards may specific the modulation schemes, coding, transfer speeds and frame format of RF interface of NFC devices (e.g., the target device 102 and the initiator device 100), as well as initialization schemes and conditions required for data (e.g., the protected payment data 400) collision-control during initialization for both passive and active NFC modes, according to one embodiment. Furthermore, they may also define the transport protocol, including protocol activation and data-exchange modes.

According to one or more embodiments, the air interface for NFC may be standardized in the ISO/IEC 18092/ECMA-340 "Near Field Communication Interface and Protocol-1" (NFCIP-1) or in the ISO/IEC 21481/ECMA-352 "Near Field Communication Interface and Protocol-2" (NFCIP-2). The initiator device 100 and the target device 102 may incorporate a variety of existing standards including ISO/IEC 14443, both Type A and Type B, and FeliCa. According to another embodiment, a common data format called NFC Data Exchange Format (NDEF) may be used to store and transport various kinds of items, including any MIME-typed object, ultra-short RTD-documents (e.g., URLs), and the protected payment data 400.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the security module 116, the input module 204, the communications module 206, the store module 208, the gesture module 218, the user module 210, the compare module 212, the match module 214, the authorize module 216, the NFC module 200, the match module 214, the access module 220, the transmit module 202 and all other modules of FIGS. 1-8 may be enabled using software and/or using transistors, logic gates, and electrical circuits (e.g., application specific integrated ASIC circuitry) such as a security circuit, a recognition circuit, a tactile pattern circuit, an association circuit, a store circuit, a transform circuit, an initial state circuit, an unlock circuit, a deny circuit, a determination circuit, a permit circuit, a user circuit, a region circuit, and other circuits.

Figure 9:
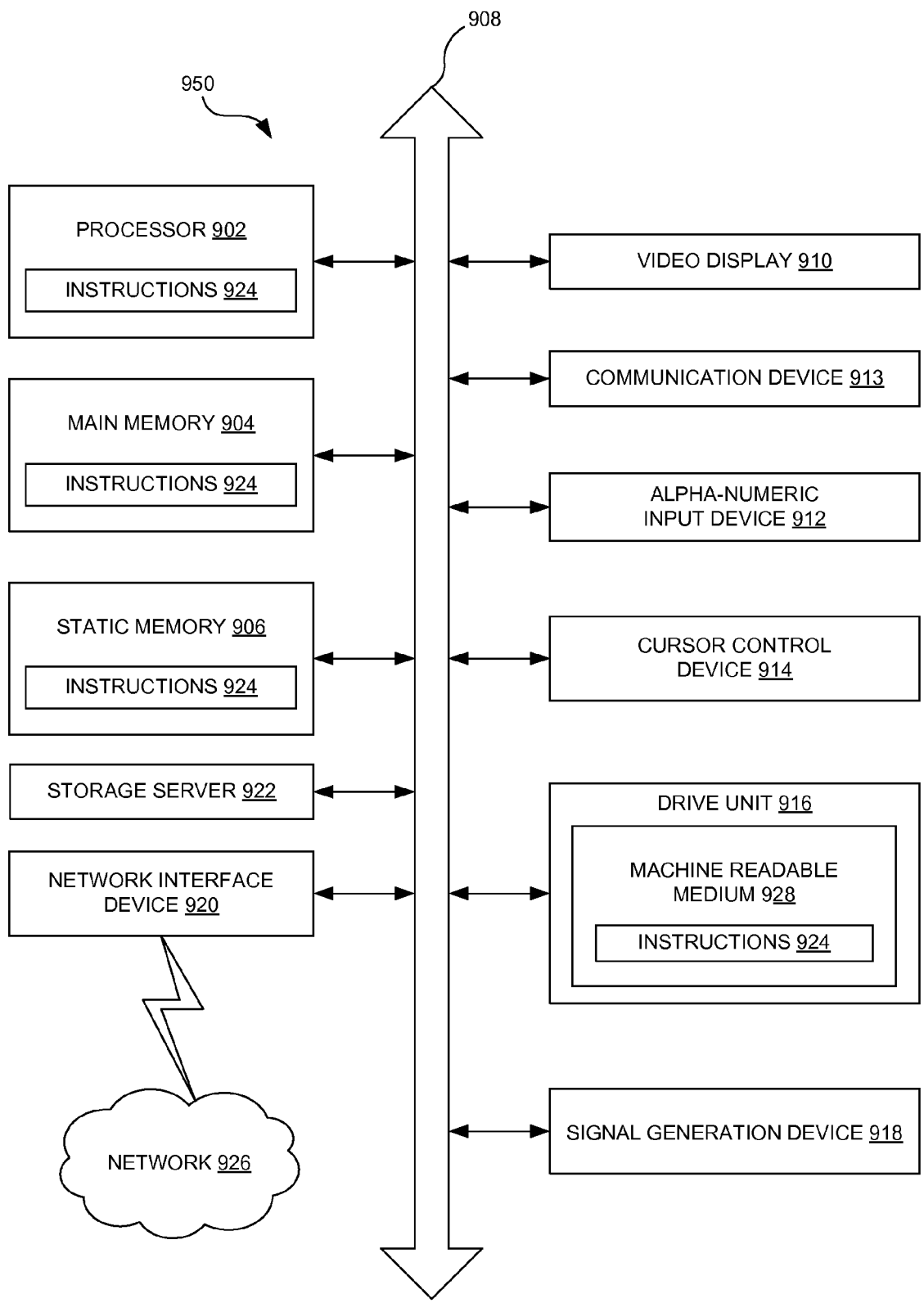
FIG. 9 is a diagrammatic view of a data processing system in which any of the embodiments disclosed herein may be performed, according to one or more embodiment.

FIG. 9 may indicate a personal computer and/or the data processing system in which one or more operations disclosed herein may be performed. The security module 116 may provide security to the device from unauthorized access (e.g., may be mishandled, misused, stolen, etc.). The processor 902 may be a microprocessor, a state machine, an application specific integrated circuit, a field programmable gate array, etc. (e.g., Intel® Pentium® processor, 620 MHz ARM1176®, etc.). The main memory 904 may be a dynamic random access memory and/or a primary memory of a computer system.

The static memory 906 may be a hard drive, a flash drive, and/or other memory information associated with the data processing system. The bus 908 may be an interconnection between various circuits and/or structures of the data processing system. The video display 910 may provide graphical representation of information on the data processing system. The alpha-numeric input device 912 may be a keypad, a keyboard, a virtual keypad of a touchscreen and/or any other input device of text (e.g., a special device to aid the physically handicapped).

The cursor control device 914 may be a pointing device such as a mouse. The drive unit 916 may be the hard drive, a storage system, and/or other longer term storage subsystem. The signal generation device 918 may be a bios and/or a functional operating system of the data processing system. The network interface device 920 may be a device that performs interface functions such as code conversion, protocol conversion and/or buffering required for communication to and from the network 926. The machine readable medium 928 may provide instructions on which any of the methods disclosed herein may be performed. The instructions 924 may provide source code and/or data code to the processor 902 to enable any one or more operations disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:
    comparing an applied gesture above a touch receptive input area of a target device with a user-defined payment gesture stored locally within the target device wherein the user-defined payment gesture is designated by an individual user of the target device;
    permitting a wireless transmission of protected payment data resident on the target device to an initiator device if the applied gesture matches the user-defined payment gesture stored locally within the target device;
    denying the wireless transmission of the protected payment data resident on the target device to the initiator device if the applied gesture does not match the user-defined payment gesture stored locally within the target device; and
    transmitting, when permitted, the protected payment data from the target device to the initiator device by magnetic induction between a loop antenna located within a first electromagnetic field of the target device and an another loop antenna located within a second electromagnetic field of the initiator device such that a strong inductive effect and a strong capacitive effect are present in a near field region of an electromagnetic radiation that emanates from the loop antenna and the another loop antenna forming an air-core transformer, wherein during the transmitting the target device operates in an emulation mode.

2. A method comprising:
    comparing an applied gesture above a touch receptive input area of a target device with a user-defined payment gesture stored locally within the target device, wherein the user-defined payment gesture is designated by an individual user of the target device, and wherein the applied gesture consists of a spatial pattern and the applied gesture is independent of a scale value and a position value on the touchscreen;
    permitting a wireless transmission of protected payment data resident on the target device to an initiator device if the applied gesture matches the user-defined payment gesture stored locally within the target device; and
    denying the wireless transmission of the protected payment data resident on the target device to the initiator device if the applied gesture does not match the user-defined payment gesture stored locally within the target device.

3. The method of claim 2 further comprising transmitting, when permitted, the protected payment data from the target device to the initiator device by magnetic induction between a loop antenna located within a first electromagnetic field of the target device and an another loop antenna located within a second electromagnetic field of the initiator device such that a strong inductive effect and a strong capacitive effect are present in a near field region of an electromagnetic radiation that emanates from the loop antenna and the another loop antenna forming an air-core transformer.

4. The method of claim 3 wherein during the transmitting the target device operates in a passive communication state such that the initiator device provides the second electromagnetic field and the target device answers by modulating the first electromagnetic field during which the target device draws at least some of its operating power from the second electromagnetic field provided by the initiator device.

5. The method of claim 3 wherein during the transmitting the target device operates in an active communication state such that the initiator device provides the second electromagnetic field and the target device answers by creating the first electromagnetic field during which the target device draws at least some of its operating power from a battery.

6. The method of claim 2 further comprising operating the target device in a peer-to-peer state.

7. The method of claim 2 further comprising permitting the user to select the protected payment data.

8. The method of claim 2 further comprising receiving a request from the initiator device.

9. The method of claim 2 wherein the target device is a mobile electronic device.

10. The method of claim 2 wherein the initiator device is a mobile electronic device.

11. The method of claim 2 further comprising transmitting, when permitted, the protected payment data from the target device to the initiator device, wherein the protected payment data are in the form of an encoded optical emission.

12. The method of claim 2 further comprising:
   accepting the user-defined payment gesture as an input above a touch receptive input area of a target device; and
   storing the user-defined payment gesture locally within the target device.

13. The method of claim 2 further comprising accessing a user-defined parameter, wherein the parameter comprises at least one of a transaction amount, an application resident on the target device, the nature of the initiator device, and the identity of the initiator device.

14. The method of claim 2 further comprising prompting the user to enter the applied gesture.

15. The method of claim 2 further comprising permitting a finite number of additional wireless transmission of one or more of the protected payment data and another protected payment data.

16. The method of claim 2 further comprising permitting, for a finite time period, additional wireless transmissions of one or more of the protected payment data and another protected payment data.

17. The method of claim 2 further comprising sending a deactivating signal to the target device preventing one or more of transmission of another protected payment data and another transmission of the protected payment data.

18. A method comprising:
   comparing an applied gesture above a touch receptive input area of a target device with a user-defined payment gesture stored locally within the target device, wherein the user-defined payment gesture is designated by an individual user of the target device, and wherein the applied gesture consists of a spatial pattern and the applied gesture does not depend on sequential activation of fixed areas on the touchscreen;
   permitting a wireless transmission of protected payment data resident on the target device to an initiator device if the applied gesture matches the user-defined payment gesture stored locally within the target device; and
   denying the wireless transmission of the protected payment data resident on the target device to the initiator device if the applied gesture does not match the user-defined payment gesture stored locally within the target device.

* * * * *